US006072895A

United States Patent [19]

Bolle et al.

[11] Patent Number: 6,072,895

[45] **Date of Patent: *Jun. 6, 2000**

[54] SYSTEM AND METHOD USING MINUTIAE PRUNING FOR FINGERPRINT IMAGE PROCESSING

[75] Inventors: Rudolf Maarten Bolle, Bedford Hills; Sharathchandra U. Pankanti, Mt. Kisco, both of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/823,637

[22] Filed: Mar. 25, 1997

Related U.S. Application Data

[60] Provisional application No. 60/034,268, Dec. 13, 1996.

[51] Int. Cl.[7] .................... G06K 9/00

[52] U.S. Cl. .................... 382/125; 382/190; 382/209

[58] Field of Search .................... 382/125, 228, 382/191, 124, 115, 190, 201–203, 209; 340/146; 356/71

[56] References Cited

U.S. PATENT DOCUMENTS

| | | | |
|---|---|---|---|
| 4,015,240 | 3/1977 | Swonger et al. | 382/237 |
| 4,151,512 | 4/1979 | Riganati et al. | 382/125 |
| 4,310,827 | 1/1982 | Asai | 382/125 |
| 4,574,393 | 3/1986 | Blackwell et al. | 382/191 |
| 4,728,186 | 3/1988 | Eguchi et al. | 356/71 |
| 4,752,966 | 6/1988 | Schiller | 382/125 |
| 4,817,183 | 3/1989 | Sparrow | 382/4 |
| 4,896,363 | 1/1990 | Taylor et al. | 382/125 |
| 4,936,680 | 6/1990 | Henkes et al. | 356/71 |
| 4,947,442 | 8/1990 | Tanaka et al. | 382/2 |
| 5,067,162 | 11/1991 | Driscoll, Jr. et al. | 382/4 |
| 5,105,467 | 4/1992 | Kim et al. | 382/127 |
| 5,109,428 | 4/1992 | Igaki et al. | 382/2 |
| 5,140,642 | 8/1992 | Hsu et al. | 382/4 |
| 5,142,592 | 8/1992 | Moler | 382/199 |
| 5,189,482 | 2/1993 | Yang | 256/71 |
| 5,271,064 | 12/1993 | Dhawan et al. | 382/6 |
| 5,392,367 | 2/1995 | Hsu et al. | 382/228 |
| 5,420,937 | 5/1995 | Davis | 382/1 |
| 5,442,672 | 8/1995 | Bjorkholm et al. | 378/124 |
| 5,493,621 | 2/1996 | Matsumura | 382/124 |
| 5,524,070 | 6/1996 | Shin et al. | 382/27 |
| 5,524,161 | 6/1996 | Omori et al. | 382/125 |
| 5,524,162 | 6/1996 | Levien | 382/54 |
| 5,613,014 | 3/1997 | Eshera et al. | 382/124 |
| 5,631,971 | 5/1997 | Sparrow | 382/125 |
| 5,631,972 | 5/1997 | Ferris et al. | 382/125 |
| 5,659,626 | 8/1997 | Ort et al. | 382/125 |
| 5,709,746 | 1/1998 | Ballard | 118/2 |
| 5,719,958 | 2/1998 | Wober et al. | 382/199 |
| 5,737,071 | 4/1998 | Arndt | 427/1 |

OTHER PUBLICATIONS

T. Ruggles, S. Thieme, and D. Elman, "Automated Fingerprint Identification Systems, I. North American Morpho System", Advances in Fingerprint Technology, pp. 212–226, CRC Press, Inc., 1994.

N. K. Ratha, S. Chen and A. K. Jain, "Adaptive Flow Orientation–Based Feature Extraction in Fingerprint Images," Pattern Recognition, vol. 28, No. 11, pp. 1657–1672, 1995.

*Primary Examiner*—Bhavesh Mehta
*Attorney, Agent, or Firm*—Louis J. Percello; Perman & Green, LLP

[57] ABSTRACT

A computer based image processing system uses an extraction process to extract one or more features from a target fingerprint image. The feature extraction process identifies one or more of the following features of the fingerprint: orthogonal image contrast, parallel image contrast, feature confidence, distance between two minutia, neighbor information, angle-distance between two minutia, angle-distance neighbor information, minutiae density, ridge length, ridge density, and wiggle factor. A pruner process, executing on the computer system, determines if one or more of the features meet any one or more of a set of pruning criteria, and that deletes the minutiae if the pruning criteria is met. The pruning process is based on (i) locations and image contrast, (ii) the distances, orientations of minutiae and (iii) spatial distributions of minutiae and ridges of the fingerprint. The minutiae that remain after the pruning can be used for feature matching.

42 Claims, 15 Drawing Sheets

600

IMAGE ACQUISITION — 610

FEATURE EXTRACTION — 620

MINUTIAE PRUNING — 635

MANUAL FEATURE EDITING (OPTIONAL) — 630

FEATURE MATCHING — 640

650

MANUAL VERIFICATION — 660

500
510
510A
DISPLAY,538
NETWORK (OPTIONAL),566
STORAGE
530
535
528
515
525
520
540
600
527
FINGERPRINT CARD, 570
IMAGING SUBSYSTEM, 580
CAMERA, 560
550
FRAMEGRABBER
SCANNER, 565

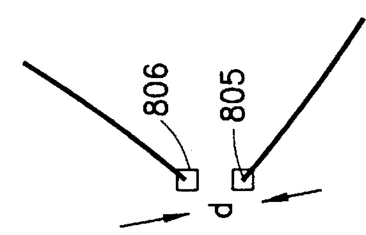
FIG.8A
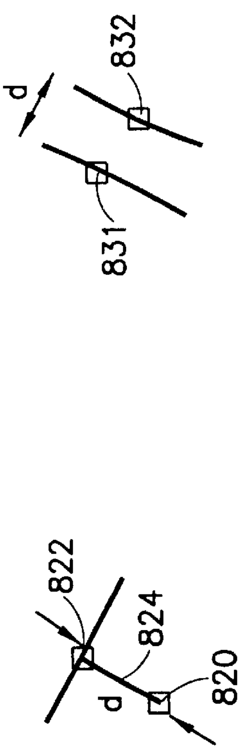
FIG.8B
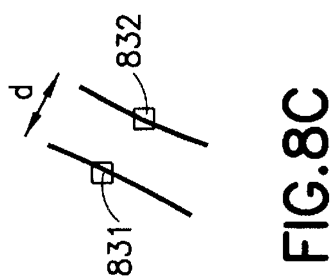
FIG.8C
FIG.8D
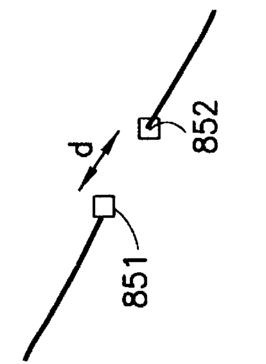
FIG.8E
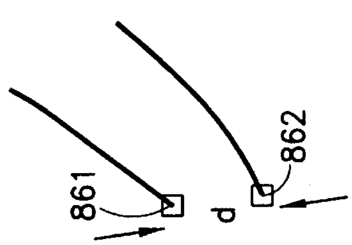
FIG.8F
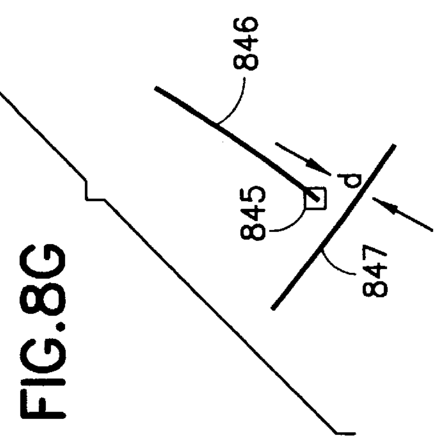
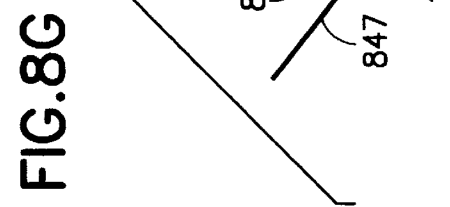
FIG.8G

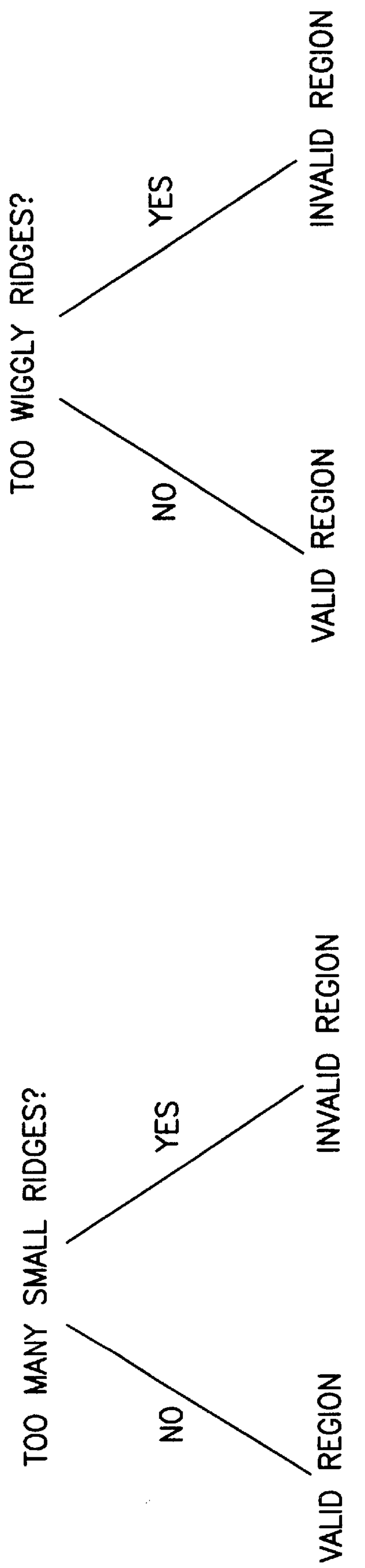
FIG.10B
FIG.10A
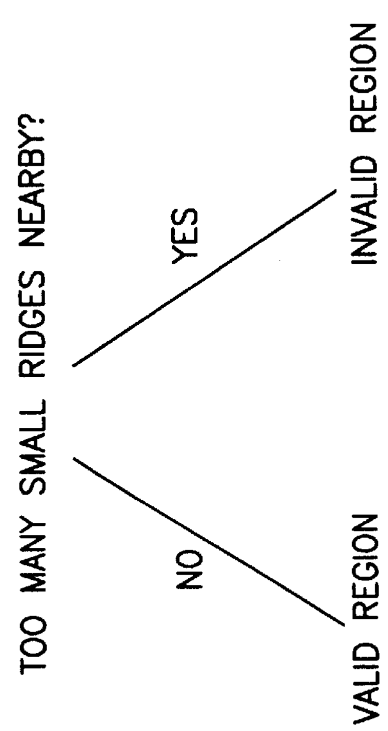
FIG.10C

SYSTEM AND METHOD USING MINUTIAE PRUNING FOR FINGERPRINT IMAGE PROCESSING

The present application claims priority to co-pending U.S. provisional application 60/034,268 filed Dec. 13, 1996.

FIELD OF THE INVENTION

This invention relates to the field of image processing. More specifically, the invention relates to a system and method for processing fingerprint images.

BACKGROUND OF THE INVENTION

There exist systems for accomplishing automatic authentication or identification of a person using his/her fingerprint. A fingerprint of a person comprises a distinctive and unique ridge pattern structure. For authentication or identification purposes, this ridge pattern structure can be characterized by endings and bifurcations of the individual ridges. These features are popularly known as minutiae.

An example fingerprint is shown in FIG. 1A. The minutiae for the fingerprint shown in FIG. 1A are shown in FIG. 1B as being enclosed by "boxes." For example, box 101B shows a bifurcation minutiae of a bifurcated ridge 101A and box 103B shows a ridge ending minutiae of ridge 103A. The ridge ending and ridge bifurcation minutiae are also illustrated as 1101B and 1103B in the schematic of a fingerprint shown in FIG. 11. Note that minutiae on the ridges in fingerprints have directions (also called orientations) 105 associated with them. Ridge orientation of ridge ending minutiae is also illustrated as 1105 in FIG. 11. The direction of a minutiae at a ridge end 103B is the direction in which the end of the ridge points. The direction of a bifurcation minutiae 101B is the direction in which the bifurcated ridge points. Minutiae also have locations which are the positions, with respect to some coordinate system, of the minutiae on the fingerprint.

One of the prevalent methods of fingerprint authentication and identification methods is based on minutiae features. These systems need to process the fingerprint images to obtain accurate and reliable minutiae features to effectively determine the identity of a person.

FIG. 2 is a flow chart showing the steps generally performed by a typical prior art system 200.

In step 210, the image is acquired. This acquisition of the image could either be through a CCD camera and framegrabber interface or through a document scanner communicating with the primary computing equipment.

Once the image is acquired into the computer memory or disk, relevant minutiae features are extracted (220). Not all of the features thus extracted are reliable; some of the unreliable features are optionally edited or pruned (step 230), e.g., through manual intervention. The resultant reliable features are used for matching the fingerprint images (step 240).

In semi-automatic systems, the unreliable features could be manually pruned by a human expert through visual inspection before the minutiae are used for matching (step 240). The following reference mentions such manual pruning system incorporated into an automatic fingerprint identification system:

Advances in Fingerprint Technology,

Edited by Henry C. Lee, R. E. Gaensslen,

Published by CRC press, Ann Arbor,

Chapter on Automated Fingerprint Identification Systems,

I. North American Morpho Systems,

Section on Fingerprint Processing Functions.

This reference is herein incorporated by reference in its entirety.

The fingerprint feature extraction 220, pruning 230, and matching system 240 constitute the primary backbone 250 of a typical minutiae-based automatic fingerprint identification systems (AFIS). The matching results are typically verified by a human expert (step 260). The verification may also be performed automatically. The following reference describes examples of the state of the prior art:

Nalini K. Ratha and Shaoyun Chen and Anil K. Jain,

Adaptive flow orientation based texture extraction in fingerprint images

Pattern Recognition, vol. 28, no. 11, pp. 1657–1672, November, 1995.

This reference is herein incorporated by reference in its entirety.

FIG. 3 is a flow chart showing the prior art steps performed by a feature extraction process 220 that are similar to some of the feature extraction methods proposed by Ratha, Jain, and Chen in the article incorporated above.

It is often not desirable to directly use the input fingerprint image for feature extraction. The fingerprint image might need an enhancement or preprocessing before one could further extract minutiae. Typically, a smoothing process is employed to reduce the pixel-wise noise (step 305).

After the preprocessing stages, prior art systems find the directions of the ridge flow (step 310). The next important step in the processing is finding the exact location of the finger in the image. To accomplish this process referred to as the foreground/background segmentation (step 315) separates the finger part of the image from the background part of the image. Once the finger part is localized, i.e., segmented to define its location, the next step is to extract the ridges from the fingerprint image (step 320). The ridges thus extracted are thick and might contain some noisy artifacts which do not correspond to any meaningful structures on the finger. These small structures, i.e., the noisy artifacts, can be safely removed and the longer structures are smoothed (step 325). The longer structures are thinned to one-pixel width and then processed to remove any other artifacts using morphological operators (step 330). The locations and orientations of ridge endings and bifurcations are then extracted from the thinned structures (step 335) to obtain the minutiae. In some systems, a "cleanup" or post processing 340 is performed. Here undesirable minutiae are removed based on some criteria.

STATEMENT OF PROBLEMS WITH THE PRIOR ART

Some prior art systems fail to correctly image fingerprints that have scars or other imperfections. Also, some prior art fails to overcome problems with optics, lighting and image acquisition (e.g., finger contact), which create "noisy" fingerprint images. Accordingly, there are a large number of unreliable features produced by these systems. Therefore, these system are not effective because it takes time to process these unreliable features and ultimately, the matching based on these unreliable features is poor.

For instance, FIG. 4A is a prior art drawing of a typical fingerprint 400 with poor quality. Specifically, region 410A is smudged. This smudging is common in fingerprints and can be caused by excessive pressure, sweat, excess ink, skin diseases, etc. Other areas of poor quality 420A can be caused by dryness of the finger in which case very little impression is produced in the image. Additionally, cracked and creased skin cause excess minutiae (106 in FIG. 1A.) Other reasons for poor quality regions include: poor optics, poor illumination, motion blur, etc. FIG. 4B is a prior art drawing of the unreliable minutiae that result from the poor quality fingerprint in FIG. 4A. This image has excess minutiae from the smudging 410B and from the dryness 420B. This "noisy" fingerprint results in an unreliable number of minutiae, i.e., the minutiae do not uniquely identify their respective fingerprint and therefore cannot be reliably matched to minutiae in a database that were extracted from the same fingerprint.

OBJECTS OF THE INVENTION

An object of this invention is an accurate and reliable fingerprint image processing system.

An object of this invention is an accurate and reliable fingerprint image processing system that reduces the number of unreliable features in the fingerprint by pruning.

SUMMARY OF THE INVENTION

The invention is a computer system and method for image processing fingerprints.

Using an extraction process, the invention extracts one or more novel features from a target fingerprint image. The feature extraction process identifies one or more of the following features of the fingerprint: orthogonal image contrast, parallel image contrast, feature confidence, distance between two minutia, neighbor information, angle-distance between two minutia, angle-distance neighbor information, minutiae density, ridge length, ridge density, and wiggle factor.

A pruner process, executing on the computer system, determines if one or more of the features meet any one or more of a set of pruning criteria, and deletes the minutiae if the pruning criteria is met. The pruning process is based on (i) locations and image contrast, (ii) the distances, orientations of minutiae and (iii) spatial distributions of minutiae and ridges of the fingerprint. The minutiae that remain after the pruning can be used for feature matching.

There are four pruning criteria in the set of pruning criteria. These criteria can be used in various combinations. The criteria are:

1. a location-based criterion that uses location of the minutiae with respect to the foreground of the image and a contrast-based criterion that uses a contrast difference between an orthogonal contrast and a parallel contrast of the minutiae taken one at a time.

2. distance- and angle-based criteria that rely on the distance between a first and second minutiae and on the difference in their orientations.

3. a distribution-based criterion that relies on a distribution density of two or more of the minutiae in a given area of the image.

4. a ridge-based criterion that relies on a ridge function that describes ridge(s) surrounding a given minutiae within a given area.

BRIEF DESCRIPTION OF THE DRAWINGS

The foregoing and other objects, aspects and advantages will be better under-stood from the following detailed description of preferred embodiments of the invention with reference to the drawings that include the following:

FIG. 8A–8G is a drawing that defines criteria for distance- and angle-based pruning.

FIG. 9, comprising

FIG. 10 shows a schematic of the components of ridge based pruning, i.e., ridge length-based (FIG. 10A), ridge shape-based (FIG. 10B), and ridge density-based (FIG. 10C) pruning.

FIG. 12, comprising

DETAILED DESCRIPTION OF THE INVENTION

Figure 5:
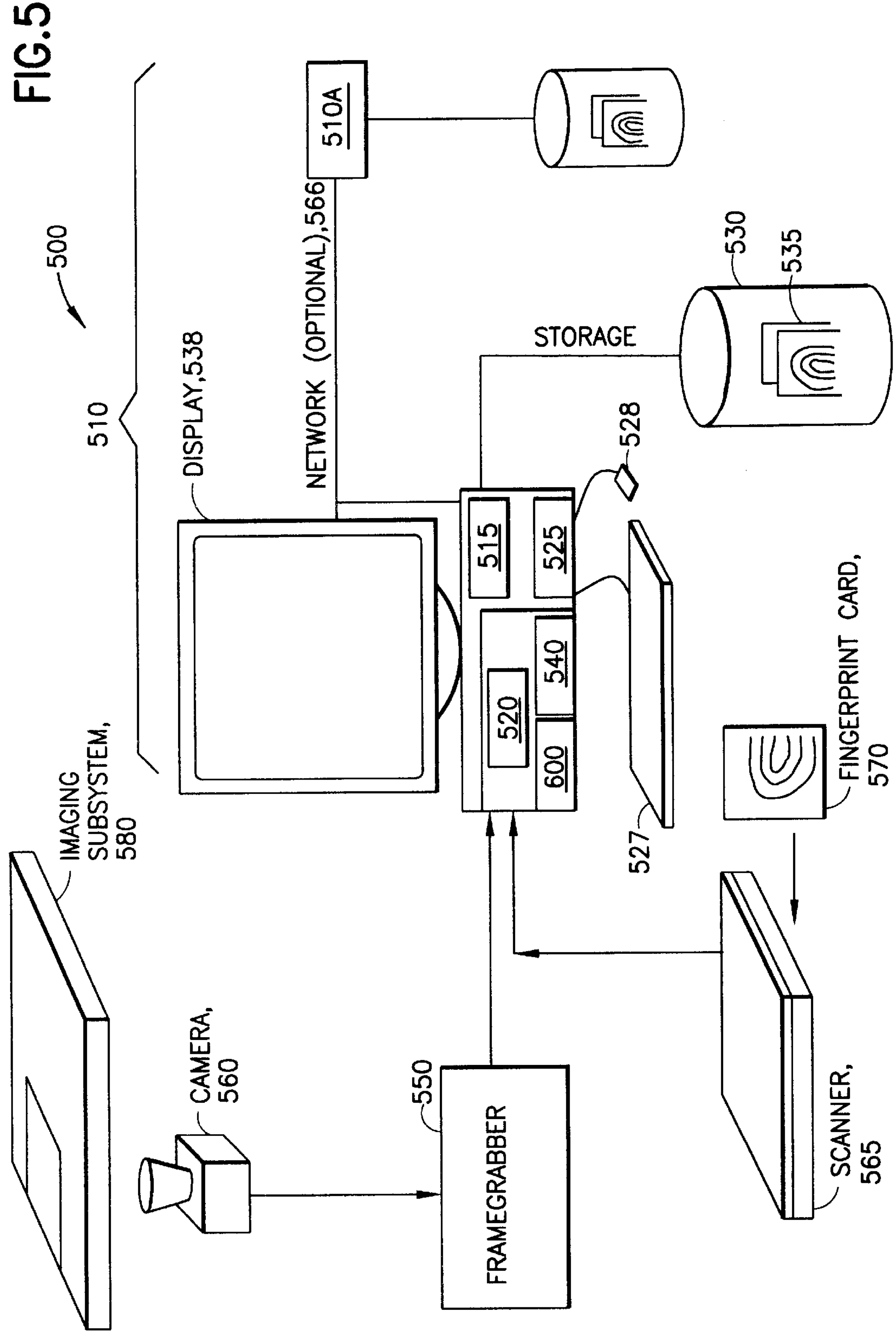
FIG. 5 is a block diagram of one preferred embodiment of the present system.

Referring now to the drawings, and more particularly to FIG. 5, there is shown the block diagram representation of a general computer hardware environment that is used as the image processing system 500. This computer 510 may be one of International Business Machines Corporation (IBM) Personal System/2 (PS/2) family of Personal Computers, a RISC System/6000, or Power Parallel System (SP/x), or equivalent. The system 500 includes one or more central processing units (CPU) 515, which may conform to any general computer architecture (e.g., Intel or a reduced instruction set microprocessor.) The CPU 515 is attached to a system bus (not shown) to which are attached a read/write and/or random access memory (RAM) 520 that can include one or more cache memories, a read only memory (ROM) 540, and an input/output adapter 525. The RAM 520 provides temporary storage for one or more application program processes 600 containing code and/or data while the ROM typically includes the basic input/output system (BIOS) code. A disk memory 530, e.g., Direct Access Storage Devices (DASDs), here represented by a hard disk drive 530, are also connected to the CPU by an appropriate adapter (not shown.) The hard disk drive 530 typically stores the computer's operating system (OS), such as IBM's OS/2 operating system, and various application programs, data, and/or databases. These databases include intermediate results and fingerprint image data 535. Typically, the input/output adapter 525 has attached to it a keyboard 527, a mouse 528, and/or other user interface devices (not shown).

The system 500 also can include a display 538, here represented as a cathode ray tube (CRT) display but which may be a liquid crystal display (LCD) or other suitable display and/or graphic user interface (GUI) 538. The display 538 is connected to the system bus via a display adapter.

The computer 510 is also interfaced with a framegrabber 550 and an image acquisition device, e.g., a camera 560 along with imaging subsystem to capture a livescan fingerprint image onto the computer memory/disk. Alternatively, the computer might be communicating with a document scanning device 565 that scans the fingerprint image from a document like an inked fingerprint card 570. Any other known means can be used to enter a fingerprint image to the memory 535, e.g., transmitting an image over a network 566 from another equivalent system 510A.

The hardware for system 500 and equivalents of these systems are well known to those skilled in the art.

Personal System/2, PS/2, OS/2, RISC System/6000, Power Parallel System, SP/x, and IBM are trademarks of the International Business Machines Corporation.

Figure 6:
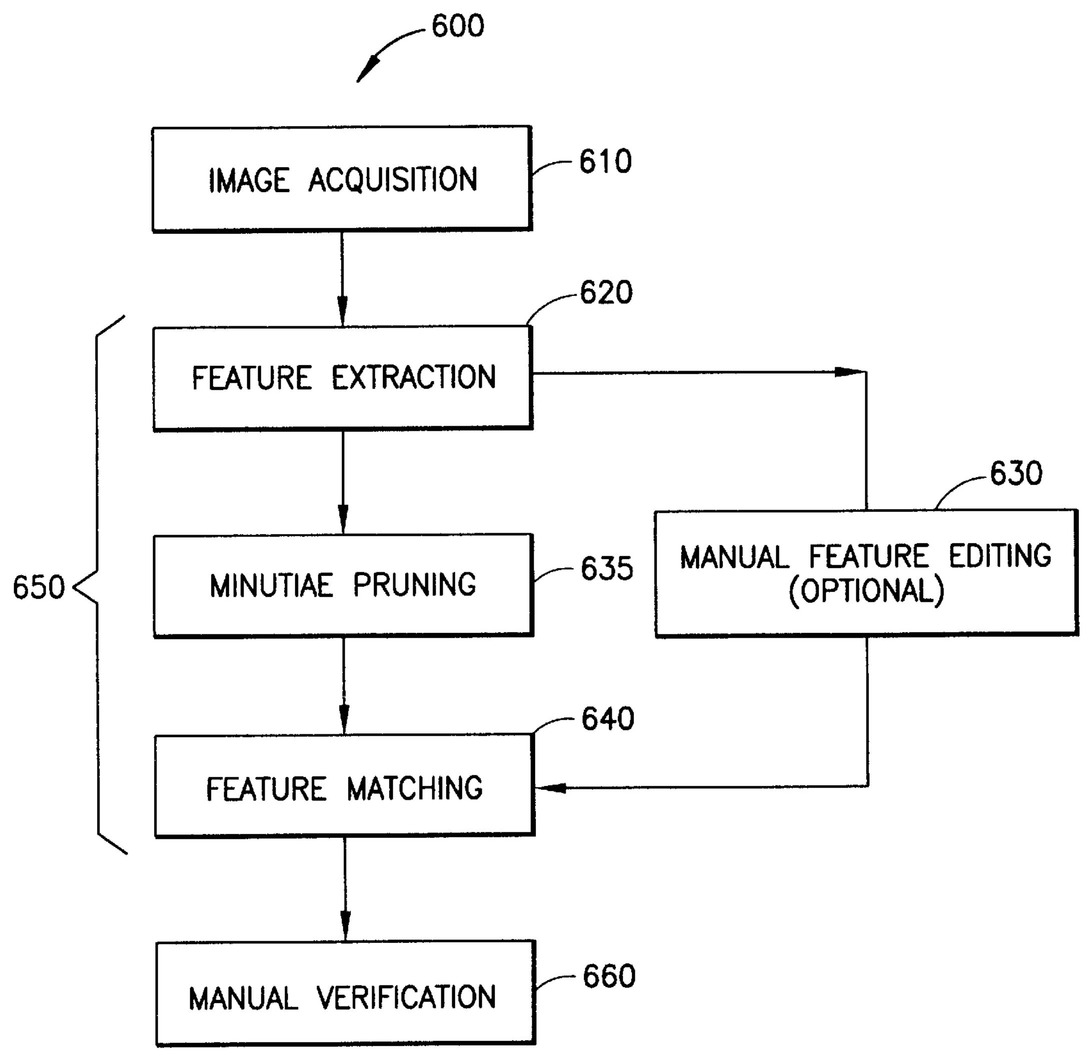
FIG. 6 is a flow chart showing the steps performed by an image extraction process of the present invention.

FIG. 6 is a flow chart showing the steps performed by a preferred automatic fingerprint identification system 600. In this embodiment 600, steps 610, 630, 660 correspond to the known prior art steps 210, 230, and 260, respectively. The feature extraction 620, the minutiae pruning 635, and feature matching 640 steps include novel functions that are described below in detail.

The feature extraction step 620 identifies one or more of the following features of the fingerprint: average foreground brightness, foreground boundary, orthogonal image contrast, parallel image contrast, feature confidence, distance between two minutia, neighbor information, angle-distance between two minutia, angle-distance neighbor information, minutiae density, ridge length, ridge density, and wiggle factor.

Average foreground brightness is determined as follows. The area of the foreground region (region occupied by the finger in the fingerprint image) is obtained from foreground-background segmentation step 315. The average of intensities of the pixels of the original input fingerprint image over this foreground area is the average foreground brightness.

Foreground boundary is determined as follows. The area of the foreground region (region occupied by the finger in the fingerprint image) is obtained from foreground-background segmentation step 315. The pixels of the foreground with one or more background pixels adjacent to them are categorized as the foreground boundary pixels.

The distance between two point coordinates referred to in this document is the geometric or Euclidean distance and computation of geometric distance and the corresponding concept of length is apparent to those skilled in the art.

A geometric line segment is a concept comprising an infinite set of geometric points, each occupying zero area; the geometric line segment could be typically defined by slope, geometric length, a pre-specified Cartesian coordinate of a point belonging to the line segment with respect to its end points. The digital line segment corresponding to a geometric line segment is described by set of pixels as determined by the discrete quantization scheme. Similarly, given a geometric point coordinate, the corresponding digital pixel is also determined by the discrete quantization scheme. These concepts of digital and geometric conversions are apparent to those skilled in the art.

Image contrast is determined by computing statistical variance of the intensities of a given set of pixels.

"Orthogonal image contrast" at a given pixel is defined as the image contrast of the pixels selected along the direction orthogonal to the ridge direction at that pixel. In a preferred embodiment, orthogonal image contrast at a given pixel is computed as follows: a pre-specified number (n) of pixels are selected along the line segment centered at the given pixel in the image and oriented in the direction orthogonal to the block direction at that pixel. Here the block direction is determined by prior art techniques. See step 310 in FIG. 3. Selecting n/2 pixels on a line segment on either side of the given pixel, where the line segment is orthogonal to the block direction and passes through the given pixel is a well known technique. The orthogonal image contrast, for the given pixel, is the statistical variance of intensities of these n selected pixels. In a preferred embodiment, n is selected to be in the range of 6 to 16 pixels. In a more preferred embodiment, n=8 pixels.

"Parallel image contrast" at a given pixel is defined as the statistical variance of the intensities of the pixels selected along the block direction at that pixel. In a preferred embodiment, parallel image contrast at a given pixel is computed as follows: a pre-specified number (m) of pixels are selected along the line segment centered at the given pixel in the image and oriented in the direction parallel to the block direction at that given pixel. Here the block direction is again determined by prior art techniques. See step 310 in FIG. 3. Selecting m/2 pixels on the parallel line segment on either side of the given pixel is a well known technique. The parallel image contrast, for the given pixel, is the statistical variance of intensities of these m selected pixels. In a preferred embodiment, m is selected to be in the range of 6 to 16 pixels. In a more preferred embodiment, m=8 pixels.

In a preferred embodiment, the parallel and orthogonal contrast are determined during the feature extraction process 620 at only the block centers of the blocks and the contrast feature for all the pixels in a block are equated to contrast features at the block center pixel.

The idea underlying computation of a feature "confidence" is that a good fingerprint image region is characterized by large variation in the pixel brightness in the direction orthogonal to the ridge directions and small variation in the pixel brightness in the direction of the ridges. The ridge orientation information is obtained from the output of step 310.

More specifically, the following expression is used to quantify the feature "confidence," G, of a fingerprint image region at pixel:

$$G=(\mathrm{Var}_o-\mathrm{Var}_p)/\log(B),$$

where $\mathrm{Var}_o$ and $\mathrm{Var}_p$ are orthogonal and parallel variances at the pixel, B is the average brightness of a square block of the pixels centered around the given pixel. In a preferred embodiment, the size of the block is in the range of 12–20 pixels, more preferably 16 pixels. In a preferred embodiment, the number of samples needed to compute $\mathrm{Var}_o$ and $\mathrm{Var}_p$ is roughly equal to the number of pixels equivalent to twice the distance between two parallel ridges on a typical fingerprint (average inter-ridge distance, T_avg). In a more preferred embodiment, the number of samples is chosen to be 16.

In a preferred embodiment, feature confidence is computed only once per block at the block center pixel and the feature confidence at any other pixel in the block is assumed to be identical to the feature confidence at the corresponding block. In a preferred embodiment, the "distance between any two minutiae" is determined by the well known Euclidean (geometric) distance between their locations and measured in number of pixels. A first minutiae is considered to be a "neighbor" to a second minutiae if the distance between the first and second minutiae is smaller than distance between the first minutiae and any other minutiae in the image.

Figure 9B:
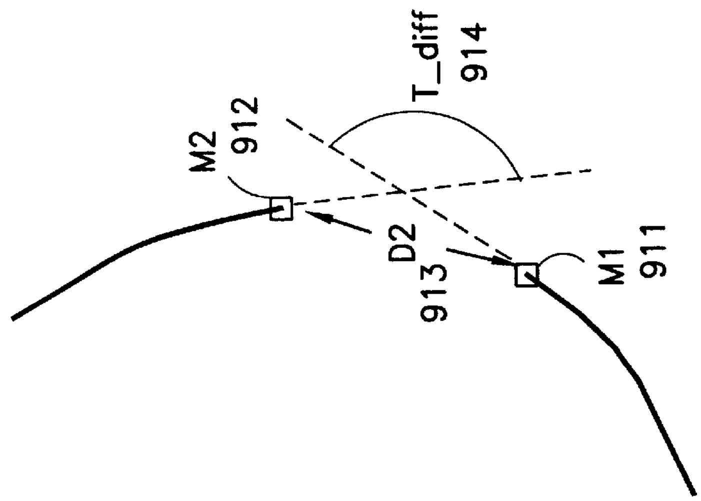
FIGS. 9A–9C shows components of distribution-based pruning, i.e., mutual neighbors (FIG. 9A), mutual AD-neighbors (FIG. 9B), and minutiae density (FIG. 9C) pruning.
Figure 9C:
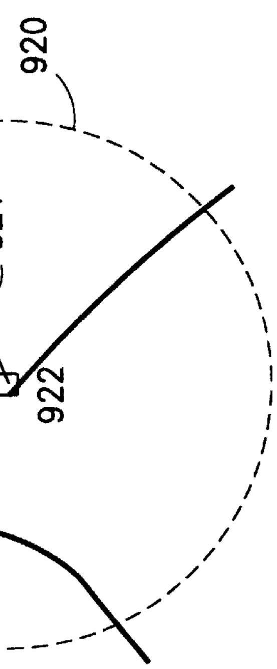
Figure 9A:
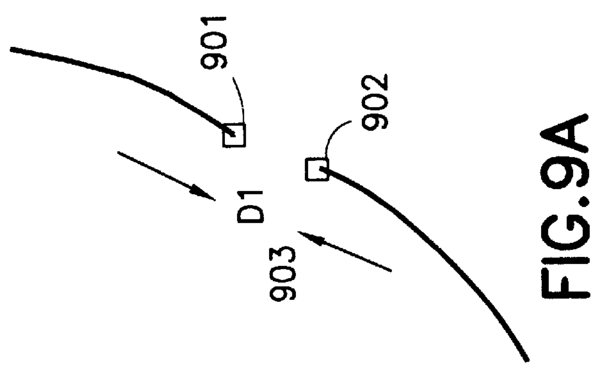

Refer to FIG. 9A. The first 901 and second 902 minutiae are considered to be "mutual neighbors" if they are each other's neighbors. During the feature extraction process 620, mutual neighbor information is also extracted. This is done by determining the geometric distance (D1) between every pair of minutiae in the image using known techniques and then applying this criteria to find which pairs of minutiae are mutual neighbors. This can be done by sorting the distance information to determine the neighbor (minimum distance) for each first minutiae and then determining if the neighbor has the first minutiae as its neighbor.

See FIG. 9B. The term "mutual angle-distance (AD) neighbors" is defined as follows: two minutiae are called mutual angle-distance neighbors if they are closest mutual neighbors based on angle-distance distance metric. The angle-distance (AD) metric is defined as follows: let abscissa, ordinate, and orientation of minutiae Mi (xi, yi, ti) respectively. The AD-distance between M1 (a first minutia) and M2 (a second minutia) is defined as a function of both locations and orientations of the minutiae in the pair.

$$D' = D2*(1.0+A),$$

where D2 913 is the regular Euclidean distance and A is defined by the following function of the degree of the anti-parallelism between the minutiae, given by:

$$A = K*(\text{difference}(t1, (t2+\pi)))\exp(J)$$

where t1 (t2) is the orientation of the first (second) minutiae in radians, difference(x, y) function evaluates absolute value of difference in orientations x and y (T_diff 914). In a preferred embodiment, K is chosen to be in the range of 0.8 to 1.2. More preferably, K=1.0. In a preferred embodiment, J is chosen to be in the range of 1.0 to 2.0; more preferably, 1.0. The mutual angle-distance feature is used to define which minutiae are close to one another in distance and have an anti-parallel (or approximate anti-parallel) orientation. Those minutiae pairs having a small mutual angle-distance feature are judged not to be minutiae at all but rather artifacts of imperfections on a ridge.

Refer to FIG. 9C. "Minutia density" at pixel is given by the number of minutiae per unit area centered around a pixel. In a preferred embodiment, the minutiae density at a pixel 922 is determined by the number of minutiae 925 in a circular area 920 of a pre-specified radius 921 centered around that pixel 922. In a preferred embodiment, area magnitude is fixed to be circle of radius 16 pixels. Further, in a preferred embodiment, the pixel 922 is selected at a minutiae location.

The "ridge lengths" are computed from the thinned ridges in the thinned image resulting in step 330. First, the ridges are segmented into ridge units at points of bifurcation. Each ridge unit is considered independently. In a preferred embodiment, length of a ridge unit is determined by the number of pixels in that ridge.

The "ridge density" at a pixel is computed by the number of ridge units per unit area centered around a pixel. In a preferred embodiment, the ridge density at a pixel is determined by the number of distinct ridges in a square area of a prespecified magnitude centered around that pixel. In a more preferred embodiment, area magnitude is fixed to be 16*16 square pixels, only the ridges of length less than certain length (16 pixels) are considered.

The "wiggle factor" of a ridge is computed as a pixel-wise change in direction of a ridge along its length. In a preferred embodiment, the sum of a pixel-wise change in direction is divided by a function of its length. The direction of the ridge at any pixel is determined by the slope of the least-square line fitting n number of ridge pixels centered around the given ridge pixel. More specifically, $$WF = \text{sum (change in direction)}/(k*\text{length})$$

where k is a constant, the change in direction is measured in degrees, i.e., the degree difference between the two directions. In a preferred embodiment, k and n are chosen to be 1 and 4, respectively.

In addition, the feature extraction step 620 also performs a novel ridge counting process. For completeness, refer to FIGS. 12 and 13 and the following description of the ridge counting process which is also used in one preferred embodiment of the feature extraction step.

Since the human skin is elastic, the image capture process might result in different distortions of the finger skin with each different capture of the fingerprint as it is being placed on the fingerprint capture station. This results in an identical pair of the features (say, minutiae) at different distances apart from each other in the different prints of the same finger captured at different times. One way to avoid this problem is to measure the distances of the features on the fingerprint in the ridge count metric.

A ridge count between any two points on the fingerprint is defined as the number of ridges running between the two points on a fingerprint. Given two points in a fingerprint image, the proposed ridge count process 1300 in FIG. 13 determines the length of the line joining the points in terms of number of ridge distances, i.e., the number of times the lines crosses the ridges. Since the ridge count is invariant to the elastic distortions of the finger, it has a better chance of representing the true invariant distance between feature points on the finger.

The thinned fingerprint image resulting from thinning process in step 330 and the confidence image resulting from the foreground background segmentation step 315 of the feature extraction process comprise two primary components of data for determination of ridge count between any two points on a fingerprint. Any pixel in the fingerprint image could be classified into three categories—either it is a ridge pixel, a valley pixel, or invalid pixel. A pixel is considered to be an invalid pixel if the feature confidence value, G, at that pixel in the image is: (1) below a threshold confidence value or (2) the pixel belongs to background portion of the fingerprint image. Otherwise, the pixel is considered to be a valid pixel. In a preferred embodiment, the threshold value of the confidence, TG, is set in the range of 0–7.8. In a more preferred embodiment, the threshold confidence value, TG, is set to 0.

If a pixel is valid and it belongs to a ridge pixel in the thinned image, it is considered to be a ridge pixel. If a pixel is valid and it does not belong to a ridge pixel in the thinned image, it is considered to be a valley pixel.

Figure 12A:
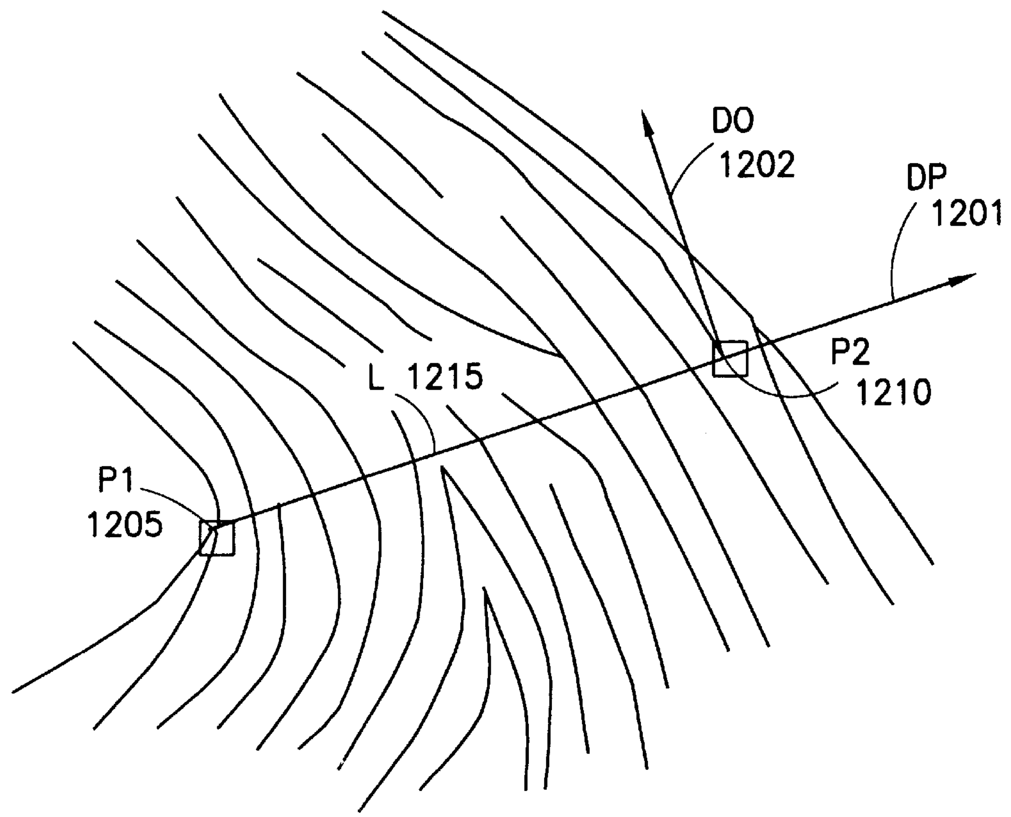
FIGS. 12A and 12B, illustrates counting ridges while traversing a line/bar of pixels.
Figure 12B:
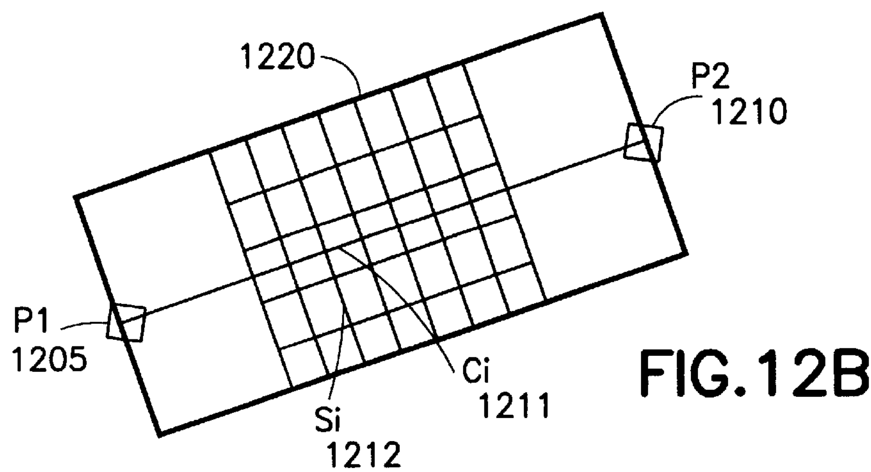
Figure 13:
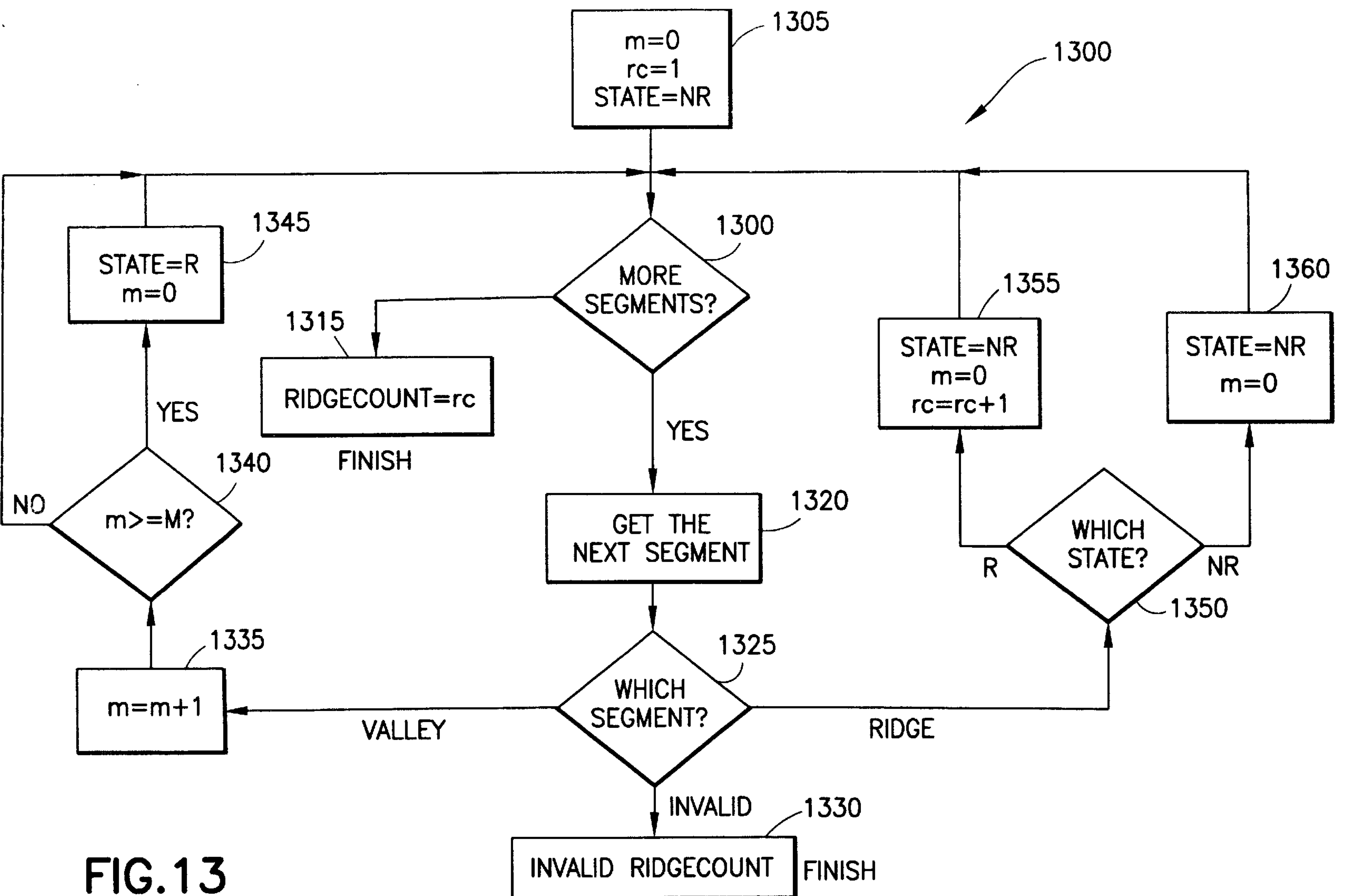
FIG. 13 is a flow chart of a ridge counting process.

Refer to FIG. 12 (comprising FIGS. 12A and 12B) and FIG. 13. These figures describe a ridge counting process that counts the number of ridges that are crossed when traversing a line between two points, e.g., minutiae. If the process encounters an invalid pixel during this traversal, the ridge count between the two points becomes invalid. Also, in a preferred embodiment, a bar, with an odd number of pixel width, is traversed in lieu of the line. Using the bar increases the probability of detecting ridge pixels and invalid pixels during the traversal and therefore makes the process 1300 more robust.

Given the two points, P1 and P2 (1205, 1210) on the fingerprint for which the ridge count is to be computed, the process 1300 traverses the thinned fingerprint image (resulting from the thinning step 330 of the feature extraction 620) along a path, e.g., a line 1215 or a roughly rectangular bar 1220 (FIG. 12B) joining the two points. The bar is of pre-specified width of an odd number of pixels, e.g. Twbar=2W+1 pixels, and is roughly bilaterally symmetric with respect to the line joining the points P1 and P2. In a preferred embodiment Twbar is in the range of 3 to 5 pixels, more preferably 3 pixels.

The traversal starts from one point P1 and proceeds in the direction DP 1201 along the line L 1215 (bar 1220) joining P1 and P2. Process 1300 determines a direction DO 1202 orthogonal to line joining P1 and P2. The traversal of the path (line 1215 or rectangular bar 1220) of pixels could be conceptually decomposed in two components: (1) a selection of a segment center Ci and, (2) given a segment center Ci, selection of pixels in a segment, Si, corresponding to Ci. For example, starting with P1, the segment centers C1, C2, C3, . . . , Ci, . . . Cz are successively selected such that they form a sequence of pixels constituting the entire path joining P1 and P2 in the monotonically decreasing order of their (geometric) distance from P2.

In a preferred embodiment, each pixel on the line L 1215 is a segment center Ci. When the path is a line 1215, these segment centers are also the segment, Si. However, when the path is a bar 1220, the segment, Si, for each segment center Ci, are the pixels on a line segment in the orthogonal direction, DO, that is centered on Ci and has a length of W on either side of Ci.

More specifically, given a segment center Ci along the path, the process 1300 selects segment Twbar=2W+1 pixels along DO centered around P1, W pixels on each side of Ci. The process 1300 then proceeds to selecting next segment center C(i+1) and selection of the segment S(i+1) corresponding to segment center C(i+1). The selection of segment centers and segments alternate and results in segment by segment traversal of all pixels comprising the rectangular bar of pixels 1220. When the path is a line, W=0.

If none of the Twbar pixels of segment Si are ridge pixels, the segment Si is considered to be valley segment. If any of the pixels comprising segment Si is a ridge pixel, the segment is considered to be ridge segment.

A segment Si is considered to be invalid segment if any of the pixels comprising that segment is considered to be invalid.

While traversing the rectangular bar of pixels 1220 from point P1 1205 to P2 1210, if the process 1300 encounters any invalid segments, the ridge count between P1 1205 and P2 1210 is considered to be invalid.

While traversing the rectangular bar of pixels 1220 from point P1 1205 to P2 1210, the process 1300 is always in one of the two states: receptive or non-receptive. Initially, the process 1300 is in non-receptive state. The process 1300 enters into receptive state only if it encounters M number of successive valley segments during its traversal. This insures that the valley is at least M segments (pixels) wide and avoids counting small distances between spurious ridge pixels as a valley. Encountering a ridge segment at any time brings the process 1300 into non-receptive state, i.e., this reinitializes the process 1300. In a preferred embodiment, the parameter M is between 2–4, more preferably 3.

The ridge count between two points P1 1205 and P2 1210 on a fingerprint is a number. This number is the number of transitions from the receptive to non-receptive state undergone by the process 1300 while traversing the rectangular bar 1220. As stated before, the ridge count between any two points is considered invalid if the process 1300 encounters an invalid segment and this holds true irrespective of the number of transitions from receptive to non-receptive state.

In some embodiments, the computation of the confidence attribute, G, might be avoided (to improve speed). In such system realizations, the foreground (background) pixels of the fingerprint as obtained in foreground/background segmentation in step 315 are considered as valid (invalid) pixels.

In some embodiments, the ridge count for every pair of points on the fingerprint is computed and used for matching fingerprints 640. In a preferred embodiment, the ridge counts are not computed for every pair of points but only between minutiae pair locations. This increases speed of the process 1300.

All pixel measures in the document presuppose the fingerprint image resolution of 512 dots per inch. The measures need to be appropriately scaled if the resolution of the given fingerprint is not 512 dots per inch. The techniques of scaling are apparent to those skilled in the art.

FIG. 13 is flow chart showing the steps of the ridge counting process 1300. The process starts 1305 with a segment counter, m, initialized to 0, a ridge count, rc, initialized to 1, and the state initialized to "non-receptive." In step 1310, the process determines if there are more segments, Si 1211, on the line 1215. If there are not, the process 1300 finishes 1315 and returns the value of the ridge count, rc. If there are more segments, the process selects 1320 the pixels belonging to the next segment, Si 1212. The process 1300 then determines 1325 if the segment is a valley segment, a ridge segment, or an invalid segment, as defined above. If the segment is invalid, the process 1300 returns a flag indicating that the ridge count is invalid and the process ends 1330. If the segment is a valley, the value m is incremented 1335 and then checked 1340 to determine if m is greater than or equal to M. If not, the process returns to step 1310. If it is, the state of the process is set 1345 to "receptive" and the segment counter, m, is set 1345 to 0.

However, if the segment is a ridge segment 1325, the state of the process 1300 is checked 1350. If the state is receptive, the state is reset to "non-receptive", the segment counter, m, is reset to 0, and the ridge count, rc, is incremented 1355. The process 1300 then returns to step 1310. If the state is "non-receptive" 1350, the segment counter, m, is reset to 0 and the state is reset to "non-receptive" 1360. The process 1300 then returns to step 1310.

A more detailed description of preferred ridge counting process(es) is given in U.S. patent application Ser. No. 08/837,069 to Bolle et al., entitled "System and Method for Determining Ridge Counts in Fingerprint Image Processing", filed on the same day as this disclosure, and herein incorporated by reference in its entirety.

Figure 7:
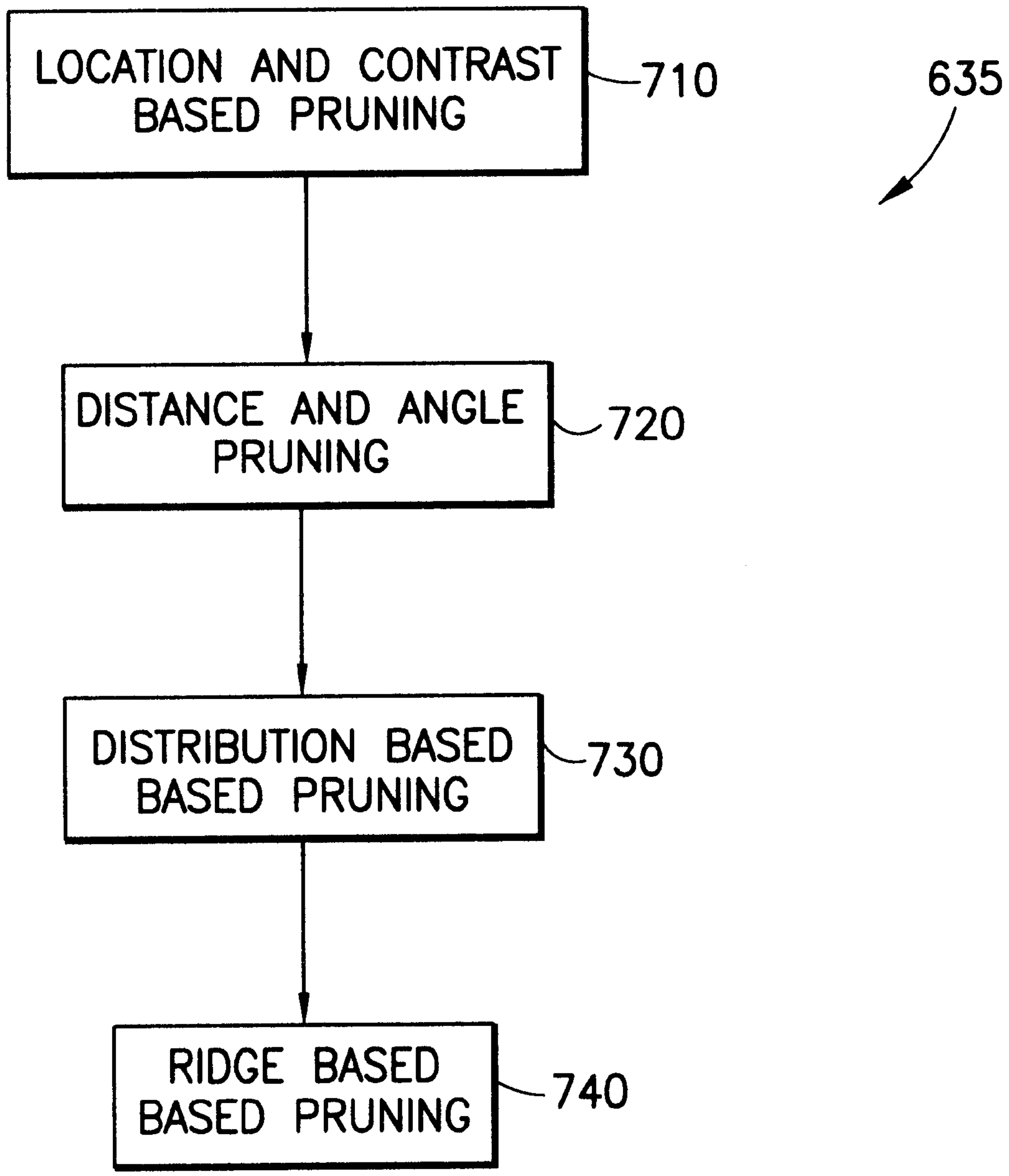
FIG. 7 is a flow chart showing the pruning method steps performed by the present invention.

Now returning back to novel minutiae pruning step 635 (FIG. 6), refer to its details illustrated in FIG. 7. The novel feature matching step 640 is performed as described in U.S. patent application Ser. No. 08/764,949. Califano et al. entitled "Method and Apparatus for Fingerprint Matching using Transformation Parameter Clustering Based on Local Feature Correspondences" that is filed on the same day as this application. This application is herein incorporated by reference in its entirety.

FIG. 7 is a flow chart showing the steps of a novel pruning process 635. In one embodiment, the steps are performed in the order shown and minutiae are deleted each time criteria in the step are met. In a preferred embodiment, the steps are performed in any order and the minutiae are marked as invalid, but not deleted, when the criteria of the step is met. In this case, all of the minutiae are used in the feature extraction 620 for each of the pruning steps in the pruning process 635. Once the process 635 is completed, all the invalid minutiae (marked) are deleted. Note that the performance of any of these steps is optional.

The set of the minutiae remaining after the deletion performed by the pruning process 635 are determined to be the reliable minutiae that can be used for matching.

The pruning process 635 is based on (i) locations and image contrast, (ii) the distances, orientations of minutiae and (iii) spatial distributions of minutiae and ridges. There are four pruning criteria in the set of pruning criteria. Any number of these criteria can be used in various combinations and order of performance. The criteria are:

1. a location-based criterion that uses location of the minutiae with respect to the foreground of the image and a contrast-based criterion (step 710) that uses a contrast difference between an orthogonal contrast and a parallel contrast of the minutiae taken one at a time.

2. distance- and angle-based criteria (step 720) that rely on the distance between a first and second minutiae and on the difference in their orientations.

3. a distribution-based criterion (step 730) that relies on a distribution density of two or more of the minutiae in a given area of the image.

4. a ridge-based criterion (step 740) that relies on a ridge function that describes ridges surrounding a given minutiae within a given area.

The location- and contrast-based pruning criteria 710 eliminate (delete) the minutiae based on their location and underlying image contrast.

Figure 11:
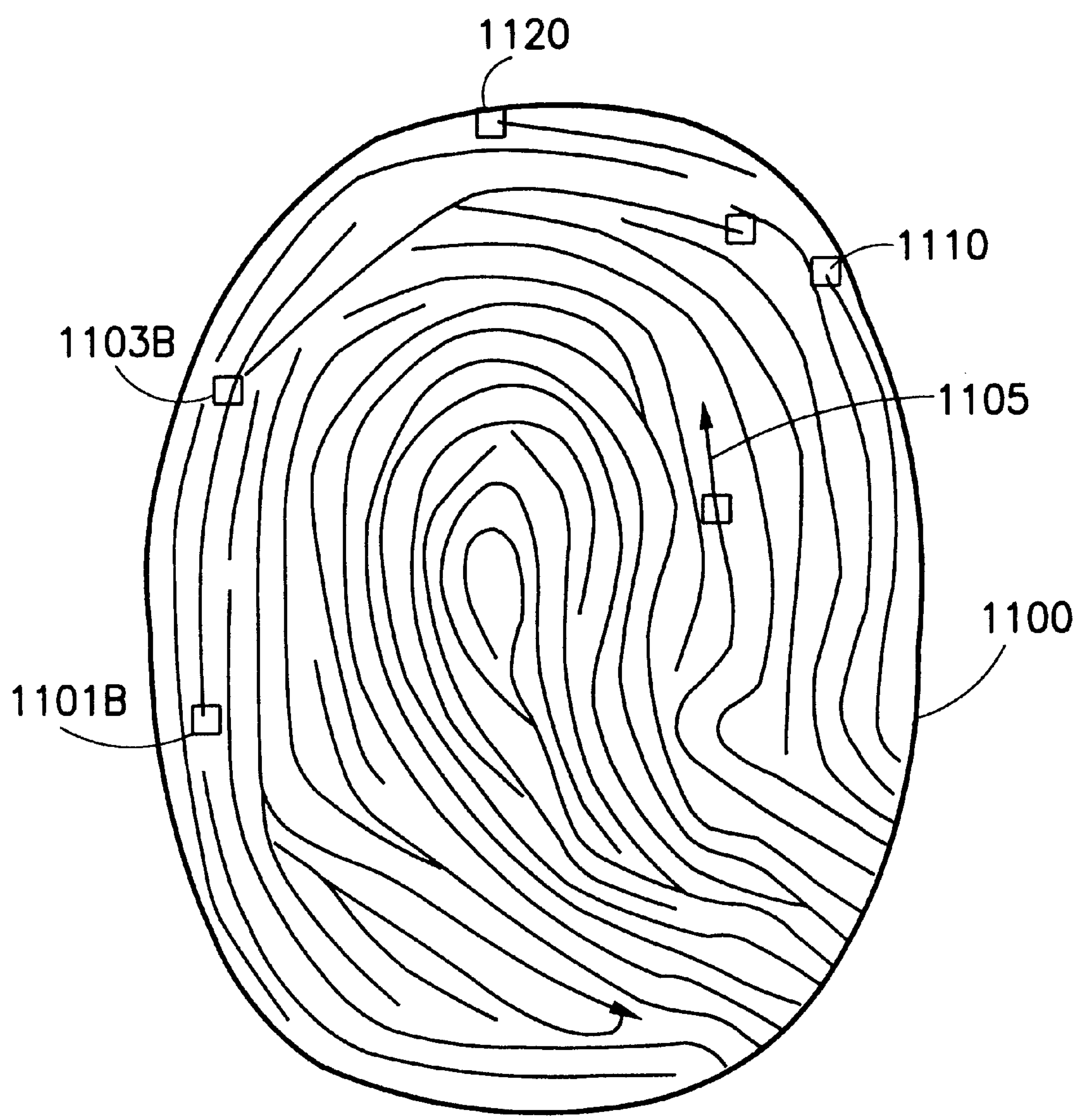
FIG. 11 shows a schematic of portion of a fingerprint with ridge ending, bifurcation, minutiae orientation, fingerprint boundary with minutiae close to the boundary.

Refer to FIG. 11. Minutiae 1110, 1120 close to the foreground boundary 1100 (boundary of the finger in the fingerprint image) are considered to be unreliable. Location-based pruning deletes minutiae which are closer than a certain distance D1 to the boundary of the foreground region. In a preferred embodiment, the distance of a given minutiae from the boundary of the foreground is determined by computing the Euclidean (geometric) distance between the location of the given minutiae and the location of the boundary pixel closest to it.

The foreground boundary information is extracted as described above. In a preferred embodiment, the value of D1 is determined by the block size. In a more preferred embodiment, D1 is chosen to be 16 pixels.

Figure 1A:
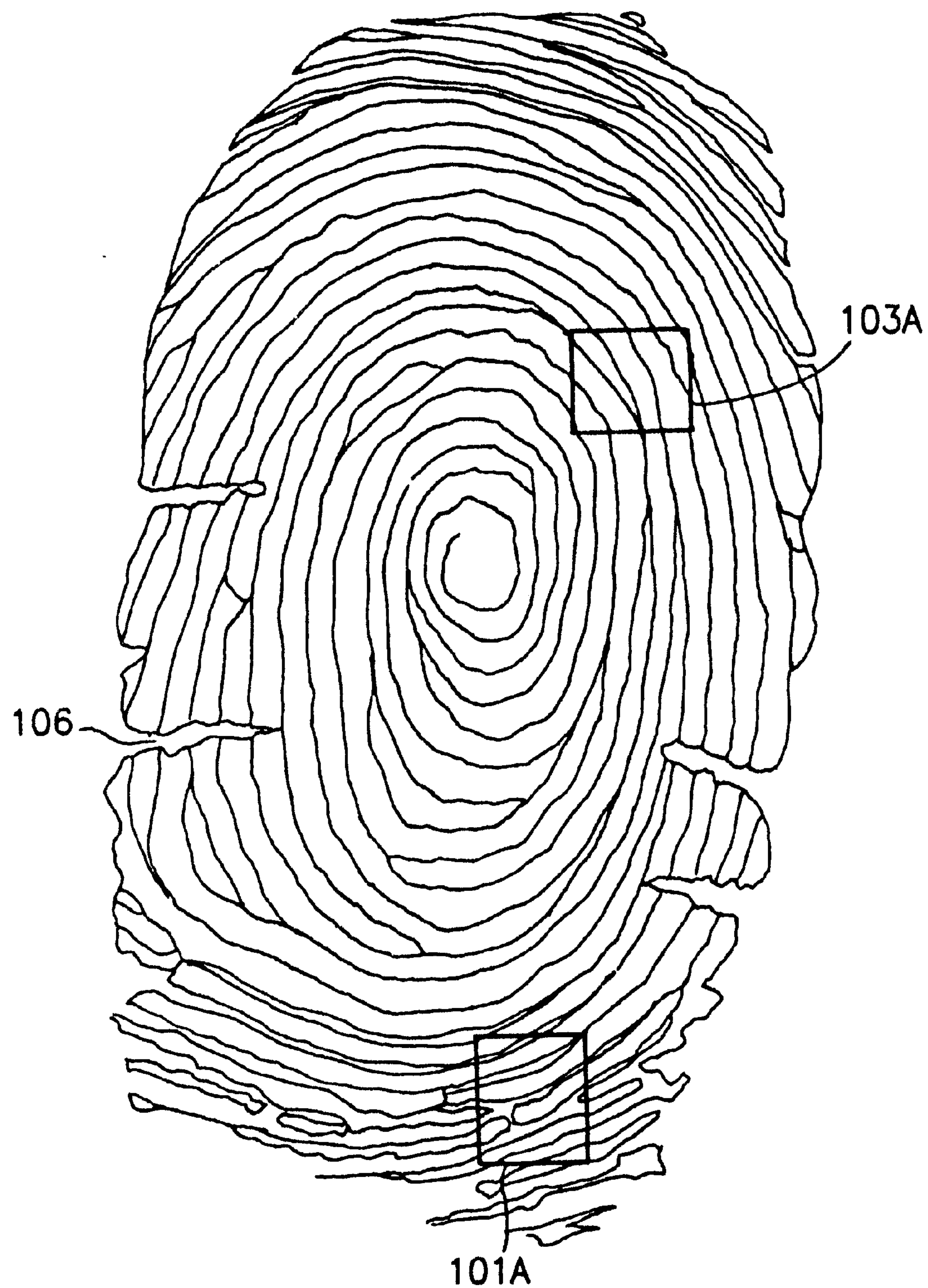
FIG. 1A is a prior art drawing of a typical fingerprint.
Figure 1B:
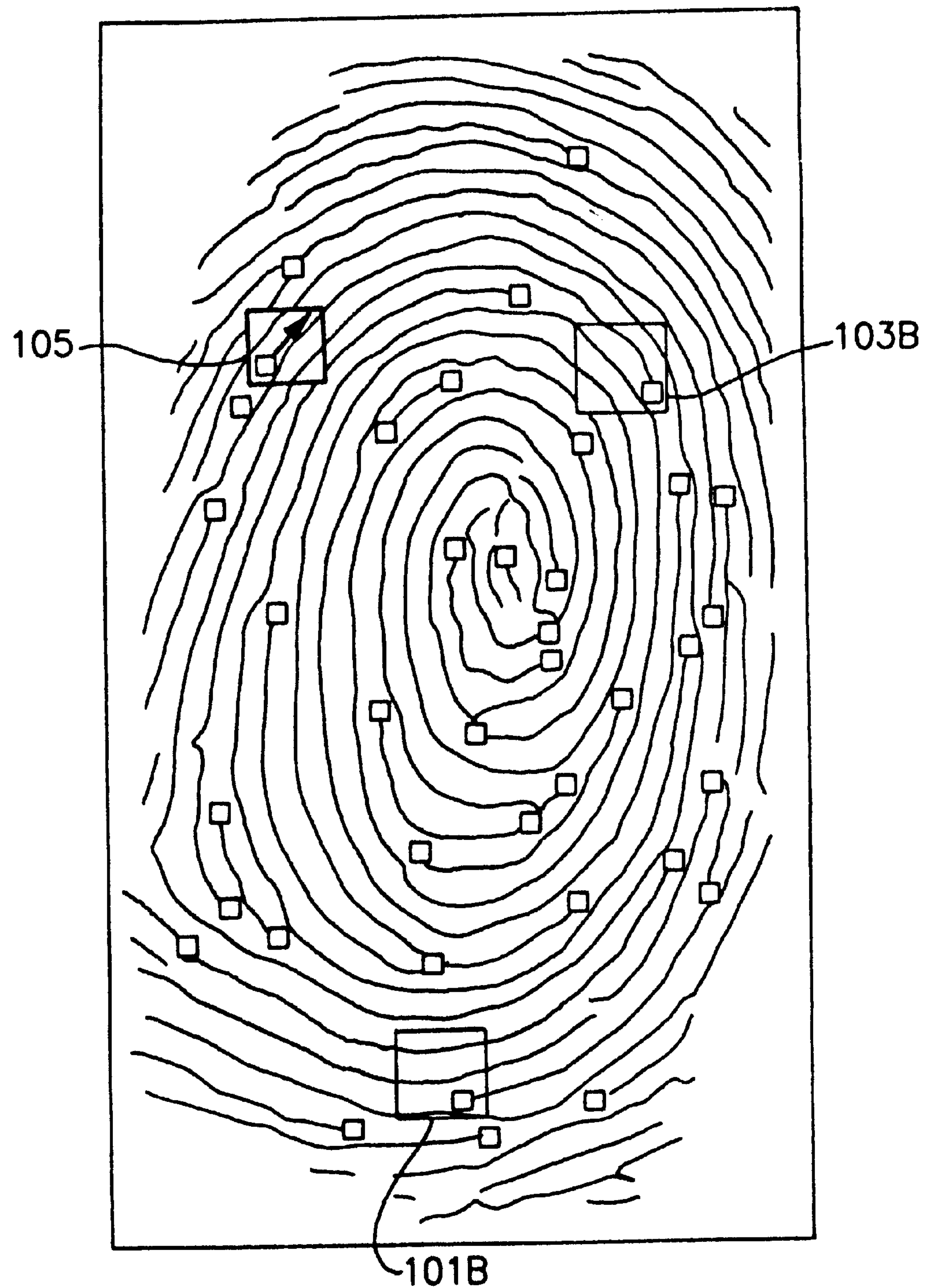
FIG. 1B is a prior art drawing showing minutiae of the fingerprint in FIG. 1A.
Figure 2:
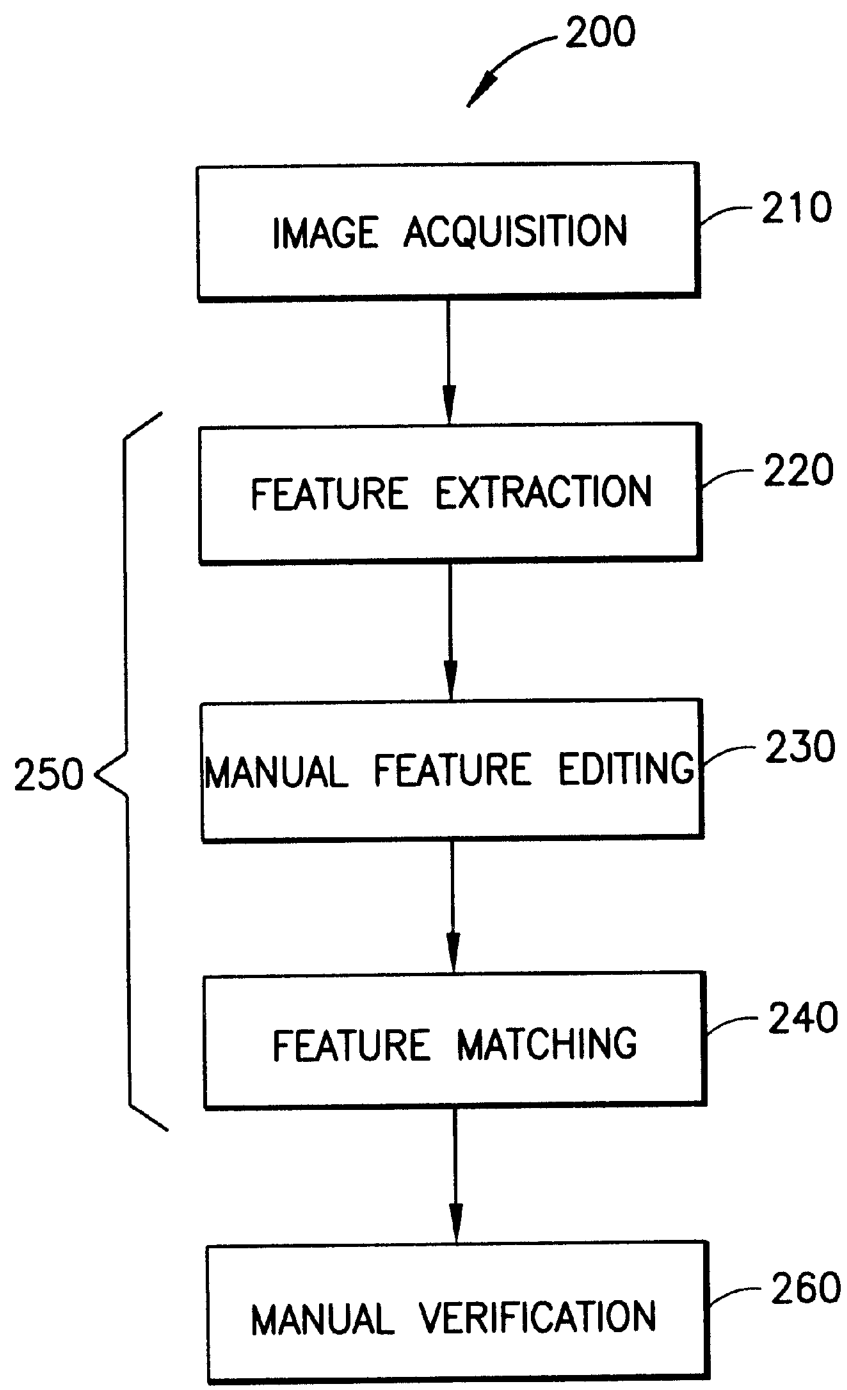
FIG. 2 is a flow chart showing the method steps performed by a typical prior art system.
Figure 3:
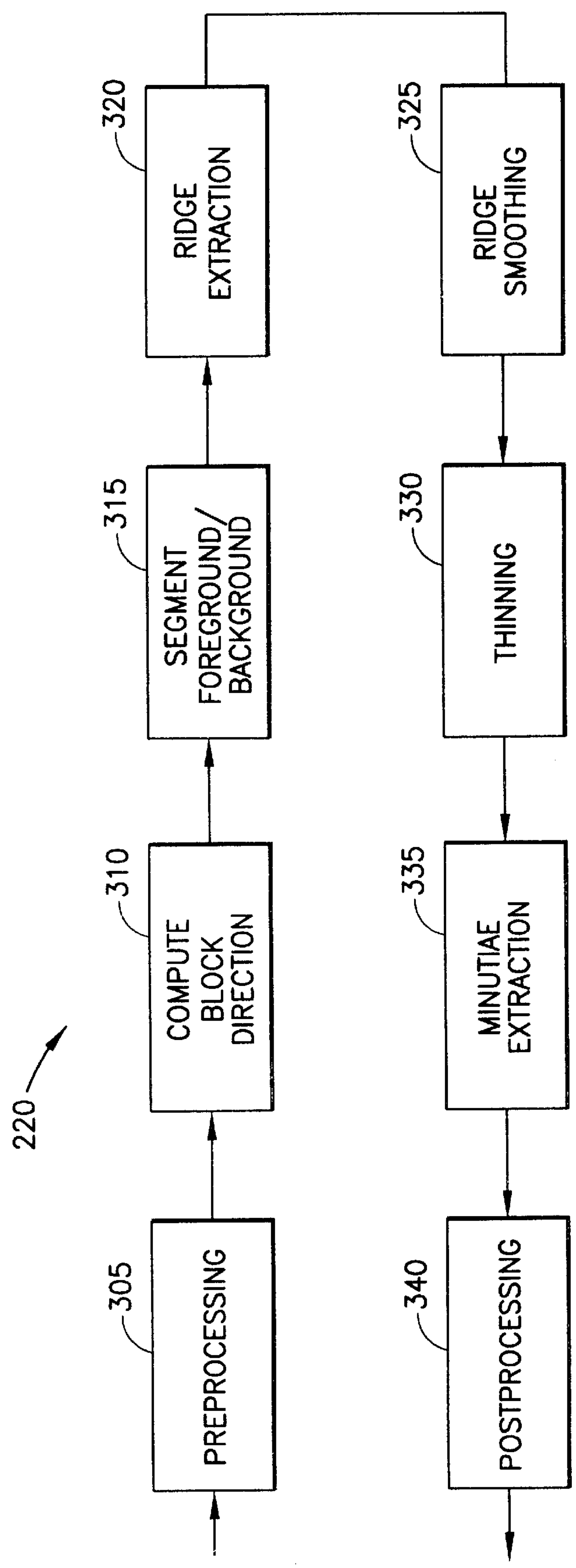
FIG. 3 is a flow chart showing the prior art steps performed by a prior art image extraction process.
Figure 4A:
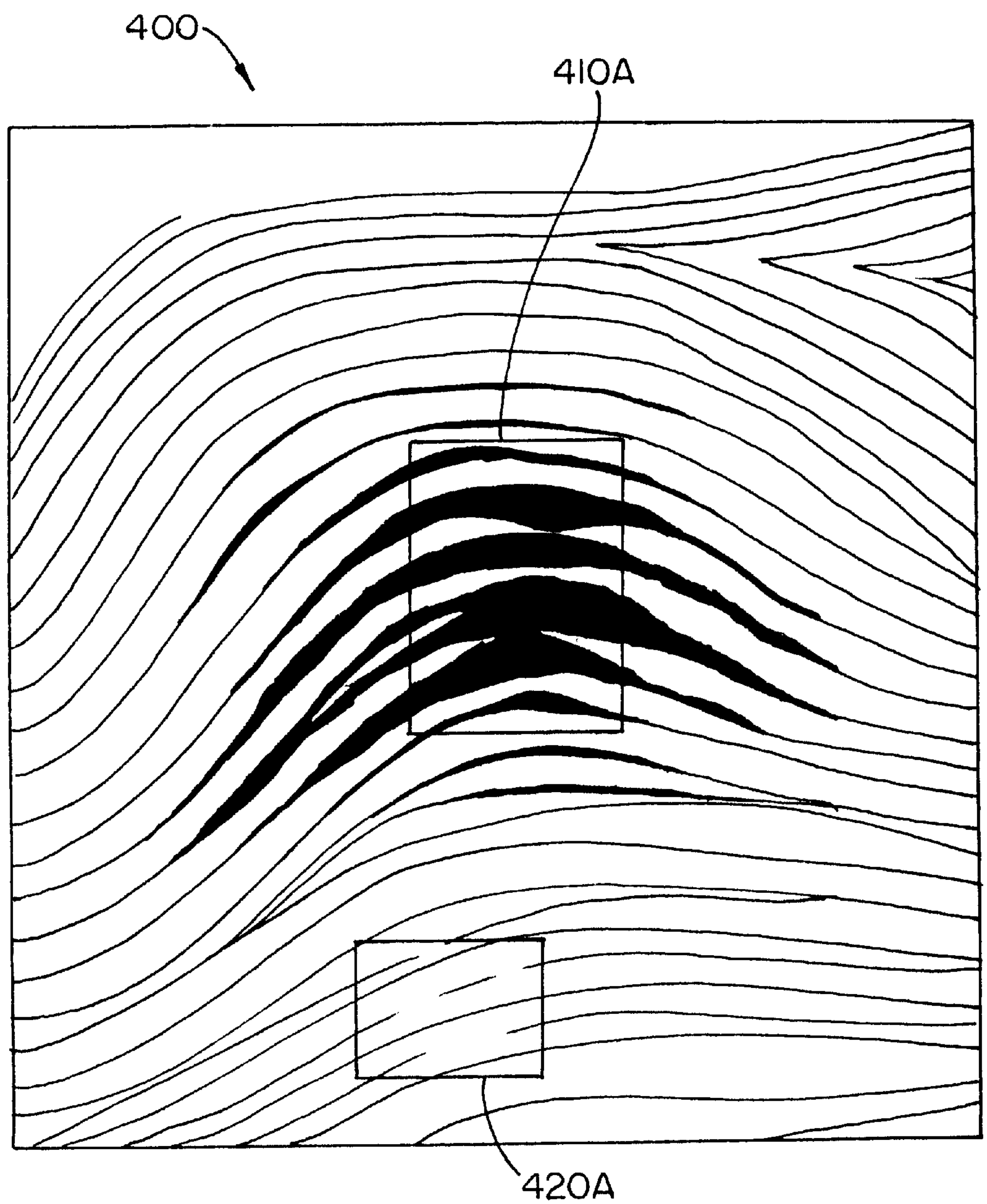
FIG. 4A is a drawing of a typical prior art fingerprint of poor quality.
Figure 4B:
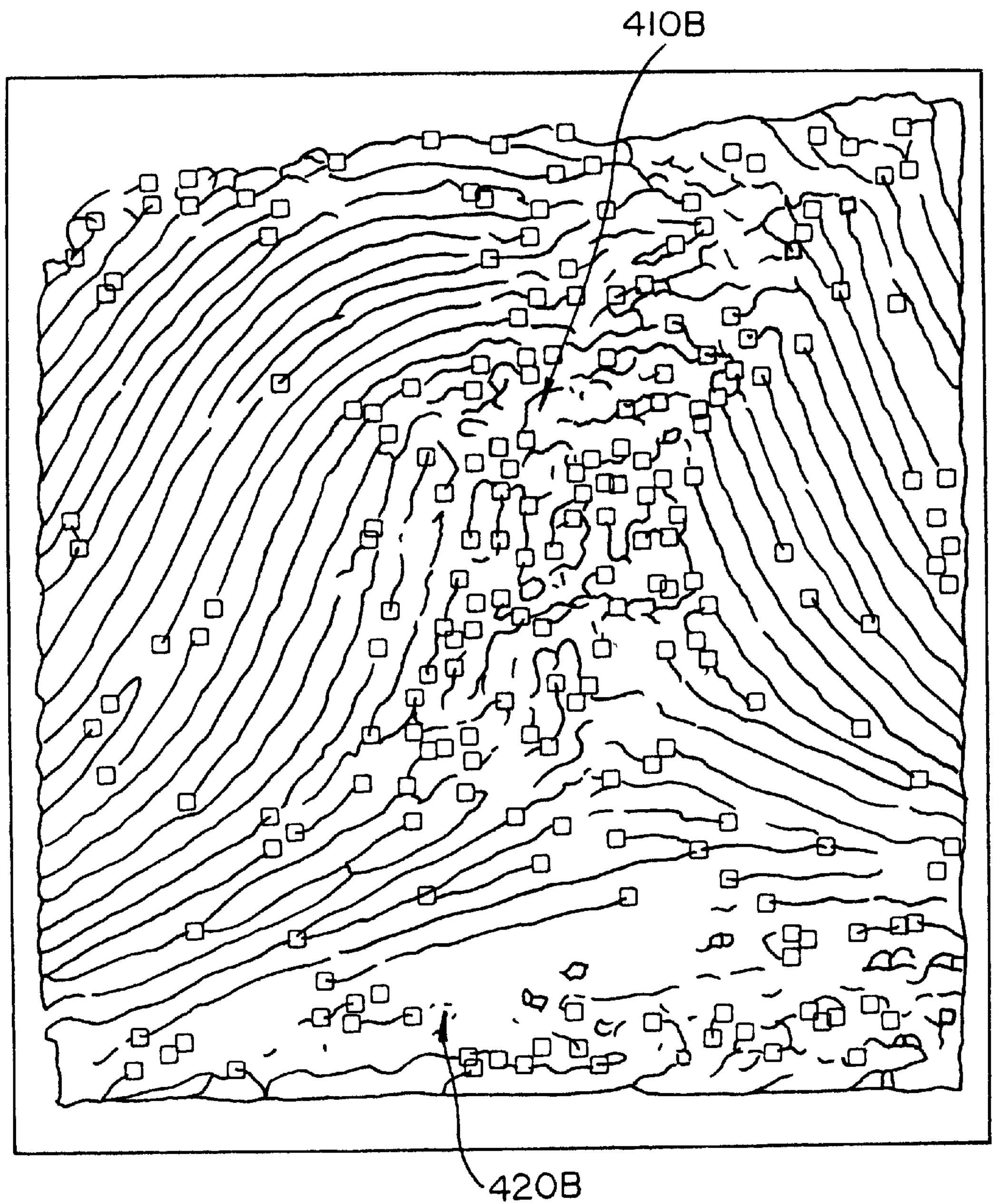
FIG. 4B is a drawing of the unreliable minutiae that result from the poor quality fingerprint in FIG. 4A.

The contrast based pruning 710 assumes that a good fingerprint image region is characterized by large variation in the pixel brightness in the direction orthogonal to the ridge directions and small variation in the pixel brightness in the direction of the ridges. The ridge orientation information is obtained from the output of step 310 (FIG. 3).

The contrast criteria is that if the confidence measure of a block, G, is less than certain threshold $T_G$ for a certain block, the minutiae originating from this block are invalidated (deleted). The threshold $T_G$ could be chosen either to eliminate a fixed fraction of the initial minutiae population, to retain a fixed number of initial minutiae population, or based on the quality of the fingerprint itself. The threshold could also be chosen based on a model of the minutiae distribution expected from a given population of the fingers and the deviation of the minutiae population from the given finger from the expected model. In a more preferred embodiment, $T_G$ is chosen to be in the range of 7.8–8.0.

The distance- and angle-based pruning 720 (FIG. 7) computations consider a pair of minutiae at a time and the pruning depends upon the minutiae location and orientation of a minutiae with respect to the other. First, the geometric distance is determined (i.e., is extracted as above) between each pair of minutiae. Then, it is determined whether minutiae comprising each pair are parallel, anti-parallel, or neither. In a preferred embodiment, this determination is directly made based on the orientation information readily available from step 620 (FIG. 6) of the feature extraction process. Two minutiae are considered to be parallel if the minutiae are oriented in the same direction with a tolerance of $d_\theta$, i.e., $(\theta_i-\theta_j)$ or $(\theta_j-\theta_i)$ is less than $\delta_\theta$, where $\theta_i$ and $\theta_j$ are the orientations of the two minutiae comprising the pair. Similarly, two minutiae are considered anti-parallel if $(180+\theta_i)$ and $\theta_j$ are parallel within a tolerance of $\delta_\theta$. When minutiae comprising a pair are neither parallel nor anti-parallel, they are classified as non-parallel. The parameter $\delta_\theta$ depends upon the quantization of the minutiae orientation information extracted from the fingerprint, noise in the fingerprint imaging system, and the artifacts of the orientation computation subsystem. More specifically, $\delta_\theta$ is chosen to be in the range of 10 to 20 degrees. More preferably, $\delta_\theta$ is 16 degrees.

There are several distance- and angle-based pruning criteria.

Some minutiae pairs (805, 806) closer than certain geometric distance (see FIG. 8A) are annihilated without any regard to their orientation. The thresholds for the distance are different for different situations. When two ridge endings are closer than a distance T_re, they are eliminated.

When a ridge ending 820 is closer than a distance T_hair from a bifurcation 822 and the ridge ending 820 and bifurcation 822 are directly connected by a ridge 824 (FIG. 8B), both the ridge ending 820 minutiae and the ridge 824 are deleted, therefore deleting the bifurcation 822.

When two bifurcations (831 and 832, FIG. 8C) are closer than T_bf distance apart, they are eliminated.

The parameters T_bf, T_re are in the same order of magnitude as the average inter-ridge distance (T_avg) of a fingerprint or fingerprint population. Any minutiae closer than the average inter-ridge distance could be safely eliminated in those situations. In a preferred embodiment, T_bf and T_re are chosen to be in the range of 2–6 pixels, preferably 4 pixels. The parameter T_hair, typically, depends upon the characteristics of the thinning process 330 used in the feature extraction component: small extraneous hair-like structures result from thinning a ridge and do not represent any physical structures on the fingerprint but are mere artifacts of the processing. In a preferred embodiment, T_hair is within the range of 2–6 pixels, preferably 4 pixels.

Other minutiae are passed through a series of composite tests based on angle as well as distance.

The anti-parallel minutiae are further distinguished into non-collinear (841 and 842, FIG. 8D) or collinear (851 and 852, FIG. 8E) depending upon the alignment of the orientation of the minutiae with the line joining the locations of the minutiae.

If either of the orientations (841, 842) are not coincident (FIG. 8D) with the line joining the minutiae 843, i.e., are not within $\delta_\phi$ of the line, the minutiae are non-collinear. If both of the orientations are coincident (FIG. 8E) with the line, within an angle $\delta_\phi$ 844, the minutiae are collinear.

The parameter $\delta_{100}$ 844 (like $\delta_\phi$) depends upon the quantization of the minutiae orientation information extracted from the fingerprint, noise in the fingerprint imaging system, and the artifacts of the orientation computation subsystem. More specifically, $\delta_{100}$ 844 is chosen to be in the range of 10–20, preferably 16 degrees.

FIG. 8D shows a pair of anti-parallel minutiae separated by a geometric distance T_at. In some criteria, two anti-parallel minutiae having a T_at less than T_atp1 are considered spurious and both the minutiae are eliminated from the list of the valid minutia. If the anti-parallel minutiae are collinear and T_at is less than a distance T_atp2 (>T_atp1), they are eliminated. If the anti-parallel minutiae have a T_at that is less than a distance T_atp3 (>T_atp2) and the average brightness of the line joining them in the original image is higher the average foreground region in the original fingerprint image, then both the minutiae are deleted from the list of the minutiae list. The thresholds T_atp1, T_atp2, and T_atp3 are determined from the estimates of the fingerprint cracks from a large population fingerprint samples. All these parameters are usually larger than the thresholds mentioned earlier for the distance-based processing alone (T_bf, T_re, and T_hair). Their relative magnitudes depend upon how aggressively the application needs to prune the minutiae population. In a preferred embodiment, T_atp1, T_atp2, and T_atp3 are chosen to be 10, 12, 25, respectively.

Other criteria dictate that parallel minutiae pairs with a geometric distance T_pt less than a distance T_t1 are annihilated (FIG. 8F). The magnitude of T_t1 depends upon the ridge extraction process, the thinning process in the feature extraction and the method of fingerprint capture. Two ridges could terminate prematurely in the original fingerprint depending upon the inking process (in the cased of the inked fingerprint capture) or the amount of the pressure (in the inked and the live scan fingerprint capture) and thus, generating two ridge ending minutiae which do not correspond to any actual minutiae features on the finger. This false ridge ending minutiae could, alternatively, be generated by the way the ridges are extracted or thinned in the feature extraction process. Usually, T_pt1 could be set to a magnitude in the same order as T_apt1. In a preferred embodiment, T_pt1 is within the range of 8–12, preferably 10.

Other criteria (FIG. 8G) use the shortest distance, T_brk, between a ridge ending minutiae 845 on a ridge 846 and a different ridge 847, where the ridge 846 is not directly connected to the ridge 847 on which ridge ending minutiae 845 is located. If T_brk is less than T_brk1: (i) the original ridge ending is deleted; (ii) the ridge ending is extended to join the the ridge, and (iii) a new ridge bifurcation is introduced at the intersection of the extended ridge ending and the ridge (FIG. 8G). The parameter T_brk1 is somewhat related to the T_pt and hence the considerations in selecting its magnitude are influenced by the factors similar to those mentioned in determining T_pt. In a preferred embodiment, T_brk is chosen in the range of 6–10, preferably 8.

Unlike the angle-distance based pruning, the distribution-based pruning 730 is based on the minutiae in the neighborhood and not on the (distance and orientation) attributes of the pair of minutiae alone. There are three components of the distribution-based pruning: mutual neighbors (FIG. 9A), mutual AD-neighbors (FIG. 9B), and density pruning (FIG. 9C). FIG. 9 shows a schematic of the components used in the distribution-based pruning.

The minutiae which are mutual nearest neighbors and closer than certain distance usually indicate that the minutiae pair under the consideration is an artifact (e.g., a crack or crease running orthogonal to the ridge orientations) and are unreliable to be considered for matching. The distance threshold for the minutiae is usually determined by the average width of crack or crease in a given finger or a population of fingers. All the pairs of minutiae which are mutual nearest neighbors closer than a distance T_mn are eliminated. In a preferred embodiment, the T_mn is in the range of 8–12, preferably 10.

If a pair of minutiae, a first and second minutia, are mutual closest AD neighbors within a AD-distance (defined above) from one another and the AD-distance is less than a threshold distance T_mna then both the minutiae are annihilated.

A situation can exist where the first and second minutiae are not mutual nearest AD-neighbors but the second minutiae is the closest AD neighbor of the first minutia, within an first AD-distance. Further, a third minutiae is a closed AD neighbor of the second, within a second AD-distance. Then the second and third minutiae are deleted if the first and second AD-distances are less than a threshold distance, T_mna. If M2 is the closest AD neighbor of M1 within an AD-distance of T_mna and there does not exist another AD-neighbor of M2 closer than its AD-distance with M1, then M1 and M2 are eliminated. If M2 is the closest AD neighbor of M1 within an AD-distance of T_mna and the closest AD-neighbor of M2 is (within AD-distance T_mna) M3, then M1 and M3 are eliminated. In a preferred embodiment, T_mna is chosen to be 15.

The density pruning is based on the spatial distribution of the minutiae and hypothesizes that several minutiae in a small neighborhood are likely to imply that the minutiae are spurious. If the minutiae density is more than a threshold T3, all the minutiae in that area are deemed unreliable. In a preferred embodiment, T3 is chosen to be 2.

Finally, the ridge-based pruning comprises of eliminating minutiae associated with the ridges deemed to be too unreliable. The "good" ridges tend to be long and smoothly curvilinear. The ridges which are too small (less than length L1) and ridges which are too wiggly (wiggle factor>W1) are removed from the finger and so are the minutiae located on these ridges. Further, if a minutiae is in the neighborhood of more than N1 number of ridges of lengths less than L2, then it is deleted. The preferred values of the parameters L1, L2, N1, W1 are 10, 15, 2, and 0.5, respectively. In the most preferred embodiment, the criteria related to ridge shape were not used.

Note that the parameter values described in this document in the units of pixels are inherently depend on the imaging configuration and assume 512 dpi resolution of the fingerprint image. The various thresholds used in this pruning method could be predetermined based on the statistical properties of the image population or could be adaptively determined for each image based upon any image properties (for instance, the signal to noise ratio) of that particular image. The thresholds could also be adaptively augmented to include the image quality, image intensity, and image brightness factor. The magnitude of the various thresholds recommended in this document were order of magnitude estimates. But the actual threshold could be more liberal or conservative depending upon the application context.

Given this disclosure alternative equivalent embodiments will become apparent to those skilled in the art. These embodiments are also within the contemplation of the inventors.

We claim:

1. A computer system for imaging fingerprints, comprising:

a computer having a user interface, a central processing unit (CPU), a disk storage that contains a plurality of data records representing one or more fingerprint images and an image capturing subsystem that produces an image of a target fingerprint;

a feature extractor that produces one or more features from the target image, the features being minutiae of the target fingerprint, feature extraction being based on an angle—distance metric defined as a function of both locations and orientations of a minutiae pair, in accordance with the relationships D'=D2 * (1.0+A), and A=K*(difference (t1, ($t_2+\pi$))) exp (J)

where D2 is the regular Euclidean distance between the minutiae;

t1 is the orientation of a first minutiae in radians;

t2 is the orientation of a second minutiae in radians;

the difference function evaluates an absolute value of the difference in orientation of the minutiae;

K is in the range of 0.8 to 1.2;

J is in the range of 1.0 to 2.0;

and wherein minutiae pairs are not extracted if D' is below a predetermined value.

2. A system, as in claim 1, further comprising:

a minutiae pruner that determines if one or more of the minutiae produced by the feature extractor meet one of a set of pruning criteria, said minutiae pruner deleting minutiae that fail to meet any one of said set of pruning criteria.

3. A system, as in claim 2, where one of the pruning criterion is that the minutiae is deleted if the edge distance from the boundary of the fingerprint image is less than an edge threshold.

4. A system, as in claim 2, where first and second minutiae are each a ridge ending, where one of the pruning criterion used for deleting both the first and second minutiae is if the distance between the first and second minutiae is less than a threshold distance.

5. A system, as in claim 4, where the threshold distance is 4 pixels.

6. A system, as in claim 2, where a first minutiae is a ridge bifurcation and a second minutiae is a ridge ending, where one of the pruning criterion used for deleting both the first and second minutiae is if the distance between the first and second minutiae is less than a threshold distance.

7. A system, as in claim 6, where the threshold distance is 4 pixels.

8. A system, as in claim 2, where first and second minutiae are ridge bifurcations, where one of the pruning criterion used for deleting both the first and second minutiae is if the distance between the first and second minutiae is less than a threshold distance.

9. A system, as in claim 8, where the threshold distance is 4 pixels.

10. A system, as in claim 2, where first and second minutiae are parallel, where one of the pruning criterion used for deleting both the first and second minutiae is if a distance between the first and second minutiae is less than a threshold distance.

11. A system, as in claim 10, where the first and second minutiae are parallel if the orientation of each of the minutiae is within a tolerance.

12. A system, as in claim 11, where the tolerance is within 16 degrees.

13. A system, as in claim 2, where one of the pruning criterion used for deleting minutiae is if first and second minutiae are within a geometric distance that is less than a threshold distance, and the orientations of the first and second minutiae are anti-parallel.

14. A system, as in claim 13, where the first and second minutiae are anti-parallel if the orientation of each of the minutiae is within a tolerance.

15. A system, as in claim 14, where the tolerance is between 10–20 degrees.

16. A system, as in claim 13, where the first and second minutiae are also collinear and are deleted if they are within a second distance threshold.

17. A system, as in claim 13, where the first and second minutiae are deleted if the first and second minutiae are also collinear, within a third distance threshold, and an average brightness of all of the pixels on a line between the first and second minutiae is greater than a brightness threshold.

18. A system, as in claim 2, where an end distance of a ridge ending minutiae is less than a threshold distance from the ridge, and where one of the pruning criterion results in the ridge ending minutiae being deleted and a new bifurcation introduced at a linearly extrapolated ridge ending intersecting the ridge.

19. A system, as in claim 18, where the threshold distance is 8 pixels.

20. A system, as in claim 2, where for a pair of minutiae comprised of first and second minutiae, one of the pruning criterion used for deleting both the first and second minutiae is if they are mutual nearest neighbors within a threshold distance.

21. A system, as in claim 20, where the threshold distance is between 8 and 12 pixels.

22. A system, as in claim 2, where for a pair of minutiae comprised of first and second minutiae, one of the pruning criterion used for deleting both the first and second minutiae is if they are mutual closest neighbors within a threshold distance.

23. A system, as in claim 22, where the threshold distance is between 12–18 pixels.

24. A system, as in claim 2, where one of the pruning criterion is based on a distribution density in a region of the target image, and the minutiae in the region are deleted if the minutiae density in the region is larger than a threshold density.

25. A system, as in claim 24, where the threshold density is between two and four.

26. A system, as in claim 2, where one of the pruning criterion is based on a ridge function, the ridge function being a length of a selected ridge, and where the selected ridge, and all of zero or more of the minutiae attached to the selected ridge, are deleted if the selected ridge has a length that is smaller that a threshold length.

27. A system, as in claim 26, where the threshold length is between eight to sixteen pixels.

28. A system, as in claim 2, where one of the pruning criterion is based on a ridge function, and the ridge function is a density of all of the ridges in a region, and the minutiae in the region are deleted if the density of ridges in the region is larger than a threshold ridge density.

29. A system, as in claim 28, where the threshold ridge density is between two and four.

30. A system, as in claim 2, where the pruning criteria are comprised of at least one of: a location of the minutiae being within an edge distance of a foreground boundary, a contrast difference between an orthogonal contrast and a parallel contrast of one or more of the minutiae, a distance between a first and second minutiae, an orientation difference between the first and second minutiae, a distribution density of two or more minutiae, a ridge ending being within a ending distance of a ridge, and a ridge function.

31. A system, as in claim 1, further comprising:

a minutiae pruner that determines if one or more of the minutiae produced by the feature extractor meet one of a set of pruning criteria, said minutiae pruner marking for subsequent deletion, minutiae that fail to meet any one of said set of pruning criteria.

32. A system, as in claim 1, wherein K=1.0.

33. A system, as in claim 1, wherein J=1.0.

34. A system for imaging fingerprints, comprising:

a computer having a user interface, a central processing unit (CPU), a disk storage that contains a plurality of data records representing one or more fingerprint images and an image capturing subsystem that produces an image of a target fingerprint;

a feature extractor that produces one or more features from the target image, the features being minutiae of the target fingerprint; and a minutiae pruner that determines if one or more of the minutiae produced by the feature extractor meet one of a set of pruning criteria, and that deletes the minutiae if the pruning criteria is met, where the pruning criteria is that the contrast difference between the orthogonal contrast and the parallel contrast of one or more of the minutiae, normalized by an average brightness over an area of the fingerprint, is less than a contrast threshold.

35. A system, as in claim 34, where the normalized contrast difference, called a feature confidence, G, is:

$$G=(Var_o-Var_p)/\log(B),$$

where $Var_o$ and $Var_p$ are orthogonal and parallel contrasts at a pixel, respectively and B is the average brightness of a neighborhood of the pixel.

36. A system for imaging fingerprints, comprising:

a computer having a user interface, a central processing unit (CPU), a disk storage that contains a plurality of data records representing one or more fingerprint images and an image capturing subsystem that produces an image of a target fingerprint;

a feature extractor that produces one or more features from the target image, the features being minutiae of the target fingerprint; and a minutiae pruner that determines if one or more of the minutiae produced by the feature extractor meet one of a set of pruning criteria, and that deletes the minutiae if the pruning criteria is met, where the pruning criteria is based on a ridge function and the ridge function is:

WF=(sum of a pixel-wise change in a direction of a selected ridge)/(k*length)), and the minutiae in the region are deleted if the WF is larger than a threshold wiggle factor, and k is preferably 1.

37. A system, as in claim 36, where the threshold wiggle factor is between 0.3 to 0.6.

38. A computer implemented method for processing a fingerprint image, comprising steps of:

inputting an image of a target fingerprint;

processing the image with a feature extractor to generate a set of minutiae of the target fingerprint, feature extraction being based on an angle—distance metric defined as a function of both locations and orientations of a minutiae pair, in accordance with the relationships D'=D2 * (1.0+A), and A=K*(difference (t1, $(t_2+\pi)$)) exp (J)

where D2 is the regular Euclidean distance between the minutiae;

t1 is the orientation of a first minutiae in radians;

t2 is the orientation of a second minutiae in radians;

the difference function evaluates an absolute value of the difference in orientations of the minutiae;

K is in the range of 0.8 to 1.2;

J is in the range of 1.0 to 2.0;

and wherein minutiae pairs are not extracted if D' is below a predetermined value.

39. A method, as claimed in claim 34, further comprising:

pruning the set of minutiae to obtain a subset of the minutiae that are determined to be the most reliable for matching the target fingerprint image to one of a plurality of prestored fingerprint images, the step of pruning using a set of pruning criteria comprised of a location and contrast-based criterion, a distance and angle-based criterion, a distribution-based criterion, and a ridge-based criterion.

40. A method, as claimed in claim 34, further comprising:

marking for pruning the set of minutiae to obtain a subset of the minutiae that are determined to be the most reliable for matching the target fingerprint image to one of a plurality of prestored fingerprint images, the step of marking for pruning using a set of pruning criteria comprised of a location and contrast-based criterion, a distance and angle-based criterion, a distribution-based criterion, and a ridge-based criterion.

41. A method, as claimed in claim 34, wherein K=1.0.

42. A method, as claimed in claim 34, wherein J=1.0.

* * * * *

UNITED STATES PATENT AND TRADEMARK OFFICE

CERTIFICATE OF CORRECTION

PATENT NO. : 6,172,895 B1
DATED : June 9, 2001
INVENTOR(S) : Dirk D. Brown, Weimin Shi, Thomas L. Sly It is certified that error appears in the above-identified patent and that said Letters Patent is hereby corrected as shown below:

Please correct the Assignee:
Correct assignee is -- High Connection Density, Inc. --

Signed and Sealed this

Eighteenth Day of September, 2001

*Attest:*

NICHOLAS P. GODICI

*Attesting Officer* *Acting Director of the United States Patent and Trademark Office*